(12) United States Patent
Murakami et al.

(10) Patent No.: US 8,284,646 B2
(45) Date of Patent: Oct. 9, 2012

(54) OBJECTIVE LENS DRIVING DEVICE, CONTROL CIRCUIT, OPTICAL DISC DEVICE AND OBJECTIVE LENS DRIVING METHOD

(75) Inventors: Yutaka Murakami, Osaka (JP); Hironori Tomita, Nara (JP)

(73) Assignee: Panasonic Corporation, Osaka (JP)

( * ) Notice: Subject to any disclaimer, the term of this patent is extended or adjusted under 35 U.S.C. 154(b) by 755 days.

(21) Appl. No.: 11/918,430

(22) PCT Filed: Apr. 6, 2006

(86) PCT No.: PCT/JP2006/307333
§ 371 (c)(1),
(2), (4) Date: Oct. 12, 2007

(87) PCT Pub. No.: WO2006/112269
PCT Pub. Date: Oct. 26, 2006

(65) Prior Publication Data
US 2009/0040905 A1    Feb. 12, 2009

(30) Foreign Application Priority Data
Apr. 13, 2005    (JP) .................. 2005-115323

(51) Int. Cl.
*G11B 15/62*    (2006.01)
*G11B 17/32*    (2006.01)
*G11B 7/00*    (2006.01)
(52) U.S. Cl. .................. 369/53.19; 369/44.32
(58) Field of Classification Search ............... 369/112.23
See application file for complete search history.

(56) References Cited

U.S. PATENT DOCUMENTS

| 4,960,321 | A  | * | 10/1990 | Takahashi .................. 359/823 |
| 5,014,256 | A  | * | 5/1991  | Horie et al. ................ 369/44.35 |
| 5,905,255 | A  | * | 5/1999  | Wakabayashi et al. ..... 250/201.5 |
| 7,477,576 | B2 | * | 1/2009  | Yonezawa et al. .......... 369/44.32 |
| 2001/0026528 | A1 | * | 10/2001 | Suzuki et al. ................ 369/244 |
| 2002/0172109 | A1 | * | 11/2002 | Fujita .......................... 369/44.16 |
| 2004/0202075 | A1 | * | 10/2004 | Ohguri ....................... 369/53.14 |
| 2005/0281147 | A1 | * | 12/2005 | Kim et al. ................... 369/44.14 |
| 2006/0181970 | A1 | * | 8/2006  | Miyagi ....................... 369/44.14 |

FOREIGN PATENT DOCUMENTS

| JP | 3125105     | 5/1993  |
| JP | 2000-293874 | 10/2000 |
| JP | 2001-6198   | 1/2001  |

OTHER PUBLICATIONS

International Search Report of Jul. 11, 2006 issued in the International Application No. PCT/JP2006/307333.

* cited by examiner

*Primary Examiner* — Joseph Haley
*Assistant Examiner* — Nicholas Lee
(74) *Attorney, Agent, or Firm* — Wenderoth, Lind & Ponack, L.L.P.

(57) ABSTRACT

An objective lens driving device includes an objective lens holder that holds an objective lens, plural elastic supporting members through that support the objective lens holder, tracking coils and that drive the objective lens holder in the tracking direction, tilting coils that tilt the objective lens holder with respect to the optical axis passing through the objective lens, a tracking control circuit that drives the tracking coils, and a tilting control circuit that drives the tilting coils. The tilting control circuit drives the tilting coils using a signal yielded by multiplying a tracking driving signal from the tracking control circuit by a specific scaling factor so as to cancel out a tilting force of the objective lens holder generated by the tracking coils.

10 Claims, 19 Drawing Sheets

OBJECTIVE LENS DRIVING DEVICE, CONTROL CIRCUIT, OPTICAL DISC DEVICE AND OBJECTIVE LENS DRIVING METHOD

BACKGROUND OF THE INVENTION

I. Technical Field

The present invention relates to an objective lens driving device, a control circuit, an optical disc device, and an objective lens driving method used to record and/or reproduce information in/from a BD (Blu-ray Disc), a DVD, a CD, an MD (MiniDisc), and so forth.

II. Description of the Related Art

An optical disc device using a disc-shaped optical recording medium (hereinafter, referred to as the optical disc), such as an optical disc and a magneto optical disc, is equipped with an optical head device that reproduces an information signal recorded in the optical disc or records an information signal therein. The optical head device includes a semiconductor laser serving as a light source that emits a beam of light irradiated onto the information recording surface of an optical disc, a beam splitter that separates return light from the optical disc, an optical system block formed of a hologram element or the like, and an objective lens driving device that focuses a beam of light emitted from the semiconductor laser on the information recording surface of the optical disc by means of the objective lens while causing the beam of light to track the information track.

The objective lens driving device is a device that adjusts the objective lens by moving the objective lens in a direction perpendicular to the information recording surface, that is, the focus direction, and in a direction parallel to the information recording surface and orthogonal to the information track of the optical disc, that is, the tracking direction, the direction same as the direction of the radius of the optical disc, for the objective lens to follow the surface deviation and the decentering of the optical disc accompanying rotations of the optical disc.

In order to move and adjust the objective lens in a range of 2 mm in the focus direction and in a range of 1 mm in the tracking direction, the objective lens driving device includes, for example, an orthogonal biaxial actuator mechanism that uses an electromagnetic force induced by a control current fed to a coil disposed in the magnetic field.

As the orthogonal biaxial actuator mechanism in practical use, there have been proposed those adopting the spring supporting structure method by which no friction is caused and a smooth driving characteristic can be obtained and the shaft-sliding structure method by which the assembly accuracy can be readily achieved and an excellent objective lens tilting posture maintaining characteristic is obtained.

In the orthogonal biaxial mechanism adopting the spring supporting structure method, a hinge type structure, a wire type structure, or a plate spring type structure has been known as the structure of elastic supporting members that hold the objective lens. The orthogonal biaxial actuator mechanism of the plate spring type structure is quite useful for a size reduction of the objective lens driving device owing to its workability and operation property.

The conventional objective lens driving device equipped with an actuator portion serving as the orthogonal biaxial actuator mechanism of the plate spring type structure as above is described, for example, in U.S. Pat. No. 3,125,105.

Hereinafter, the conventional objective lens driving device will be described using FIG. 17 through FIG. 19. FIG. 17 is an overall perspective view showing an example of the actuator portion in the conventional objective lens driving device. FIG. 18 is a view showing the configuration of a control circuit in the conventional objective lens driving device. FIG. 19 is a partial sectional side view of the actuator portion shown in FIG. 17.

Referring to FIG. 17 through FIG. 19, an objective lens 1 is made by means of glass press or resin molding, and an objective lens holder 2 is made by means of resin molding and has a hole into which the objective lens 1 is inserted. The objective lens 1 is fixed to the objective lens holder 2 by means of bonding. Also, a focus coil 3 with turns about the Z-axis and tracking coils 4A through 4D with turns about the X-axis are bonded and fixed to the objective lens holder 2. The objective lens 1, the objective lens holder 2, the focus coil 3, and the tracking coils 4A through 4D together form a movable portion 5.

Elastic supporting members 6A through 6D are formed of thin plate spring materials, and one end of each is fixed to the side surface of the objective lens holder 2 and the other end is fixedly bonded to a fixing member 7 made by means of resin molding. The fixing member 7 is fixed to a base member 8. Owing to this supporting structure, the elastic supporting members 6A through 6D support the movable portion 5 so as to be able to oscillate in the focus direction (Z-axis direction) and in the tracking direction (Y-axis direction).

The elastic supporting members 6A through 6D are made by punching a metal plate, which is made of phosphor bronze, beryllium copper, or the like excellent in both the current passing property and the spring characteristic, by means of sheet metal press working, and they also pass a current to the focus coil 3 and the tracking coils 4A through 4D.

The base member 8 is made of ferromagnetic metal, such as iron, and includes a yoke 9A and a yoke 9B that oppose each other with the focus coil 3 and the tracking coils 4A through 4D in between. A permanent magnet 10A and a permanent magnet 10B each having the magnetic pole direction in the X-axis direction and different magnetic poles in the surfaces opposing each other are bonded and fixed to the yoke 9A and the yoke 9B, respectively, thereby forming a magnetic circuit.

A control circuit to drive an actuator portion 901 configured as described above is formed of, as is shown in FIG. 18, a focus control circuit 31 that supplies the focus coil 3 with a current corresponding to a focus driving signal and a tracking control circuit 41 that supplies the tracking coils 4A through 4D with a current corresponding to a tracking driving signal.

In the actuator portion 901 and the control circuit configured as above, when a current corresponding to the focus driving signal is supplied to the focus coil 3 from the focus control circuit 31, an electromagnetic driving force that drives the movable portion 5 in the focus direction is generated by the current flowing through the focus coil 3 and magnetic fluxes from the permanent magnet 10A and the permanent magnet 10B forming the magnetic circuit.

The electromagnetic driving force causes the objective lens 1 to move in the focus direction parallel to the optical axis, so that a focus adjustment operation is performed for a beam of light emitted from the semiconductor laser to be irradiated onto an optical disc. When the focus adjustment operation is performed, the movable portion 5, more specifically, the position of the objective lens 1, is adjusted in the Z-axis direction as the elastic supporting members 6A through 6D whose end portions are fixed to the fixing member 7 undergo elastic displacement in the focus direction (Z-axis direction) in FIG. 17.

Also, in the actuator portion 901 and the control circuit, when a current corresponding to the tracking driving signal is supplied to the tracking coils 4A through 4D from the tracking control circuit 41, a magnetic driving force that drives the movable portion 5 in the tracking direction (Y-axis direction) is generated by the current flowing through the tracking coils 4A through 4D in portions parallel to the optical axis of the objective lens 1 and magnetic fluxes from the permanent magnet 10A and the permanent magnet 10B forming the magnetic circuit.

The magnetic driving force causes the objective lens 1 to move in the tracking direction orthogonal to the optical axis, so that a tracking adjustment operation is performed for a beam of light emitted from the semiconductor laser to be irradiated onto an optical disc. When the tracking adjustment operation is performed, the movable portion 5, more specifically, the position of the objective lens 1, is adjusted in the Y-axis direction as the elastic supporting members 6A through 6D whose end portions are fixed to the fixing member 7 undergo elastic displacement in the tracking direction (Y-axis direction) in FIG. 17.

In order to prevent the occurrence of tilting of the movable portion 5 with respect to the XY plane during the displacement operation of the movable portion 5 in the focus direction and the tracking direction, it is necessary to make the center of gravity of the movable portion 5, the supporting center of the elastic supporting members 6A through 6D supporting the movable portion 5, and the centers of the driving forces generated in the focus coil 3 and the tracking coils 4A through 4D coincide one with another within a plane orthogonal to the direction along which the displacement operation takes place.

Herein, because the objective lens 1 is disposed in the movable portion 5 on the optical disc side, the center of gravity of the movable portion 5 is on the plus side of the Z-axis, and in particular, it coincides neither with the supporting center of the elastic supporting members 6A through 6D nor with the center of the driving force of the tracking coils 4A through 4D. Hence, as is shown in FIG. 19, the center of gravity of the movable portion 5, the supporting center of the elastic supporting members 6A through 6D, the center of the focus driving force, and the center of the tracking driving force are made to coincide with a point CG by lowering the center of gravity of the movable portion 5 with the use of a balancer 90 made of brass or the like and fixedly bonded to the bottom of the objective lens holder 2 (on the minus side of the Z-axis) by means of bonding or fusion bonding.

However, with the conventional configuration as described above, there is a need to additionally provide the balancer 90, which consequently increases the weight of the movable portion 5. This raises a problem that the driving current is increased and so is the power consumption. In addition, because a space in which to attach the balancer 90 is required, there is another problem that it is difficult to make the actuator portion 901 thinner.

SUMMARY OF THE INVENTION

An object of the invention is to provide an objective lens driving device capable of reducing power consumption and reducing the thickness thereof while suppressing the occurrence of tilting of the objective lens holder, a control circuit, an optical disc device, and an objective lens driving method.

An objective lens driving device according to an aspect of the invention includes: an objective lens holder that holds an objective lens; plural elastic supporting members that support the objective lens holder; a tracking driving member that drives the objective lens holder in a tracking direction; a tilting correction member that tilts the objective lens holder with respect to an optical axis passing through the objective lens; a tracking control circuit that drives the tracking driving member; and a tilting control circuit that drives the tilting correction member on the basis of a tracking driving signal generated in the tracking control circuit so as to cancel out a tilting force of the objective lens holder generated by the tracking driving member.

An optical disc device according to another aspect of the invention is configured to include the objective lens driving devices described above, and to record and/or reproduce information in/from an optical disc using the objective lens driving device.

A control circuit according to still another aspect of the invention includes: a tracking control circuit that drives a tracking driving member driving an objective lens holder, which is supported on plural elastic supporting members and holds an objective lens, in a tracking direction; and a tilting control circuit that drives a tilting correction member that tilts the objective lens holder with respect to an optical axis passing through the objective lens on the basis of a tracking driving signal generated in the tracking control circuit so as to cancel out a tilting force of the objective lens holder generated by the tracking driving member.

A method of driving an objective lens according to still another aspect of the invention includes: a step of driving a tracking driving member that drives an objective lens holder, which is supported on plural elastic supporting members and holds an objective lens, in a tracking direction; and a step of driving a tilting correction member that tilts the objective lens holder with respect to an optical axis passing through the objective lens on the basis of a tracking driving signal from the tracking driving member so as to cancel out a tilting force of the objective lens holder generated by the tracking driving member.

According to the respective configurations described above, because the tilting of the objective lens holder can be corrected by driving the tilting correction member on the basis of the tracking driving signal driving the tracking driving member so as to cancel out the tilting force of the objective lens holder generated by the tracking driving member, it is possible to eliminate the need to make the center position of the tracking driving force coincide with the position of the center of gravity of the movable portion formed of the objective lens holder and the like. Hence, because there is no need to additionally provide the balancer, not only is it possible to reduce power consumption of the objective lens driving device, but it is also possible to make the objective lens driving device thinner while suppressing the occurrence of tilting of the objective lens holder.

DETAILED DESCRIPTION OF THE INVENTION

Hereinafter, respective embodiments of the invention will be described with the use of the drawings.

First Embodiment

Figure 1:
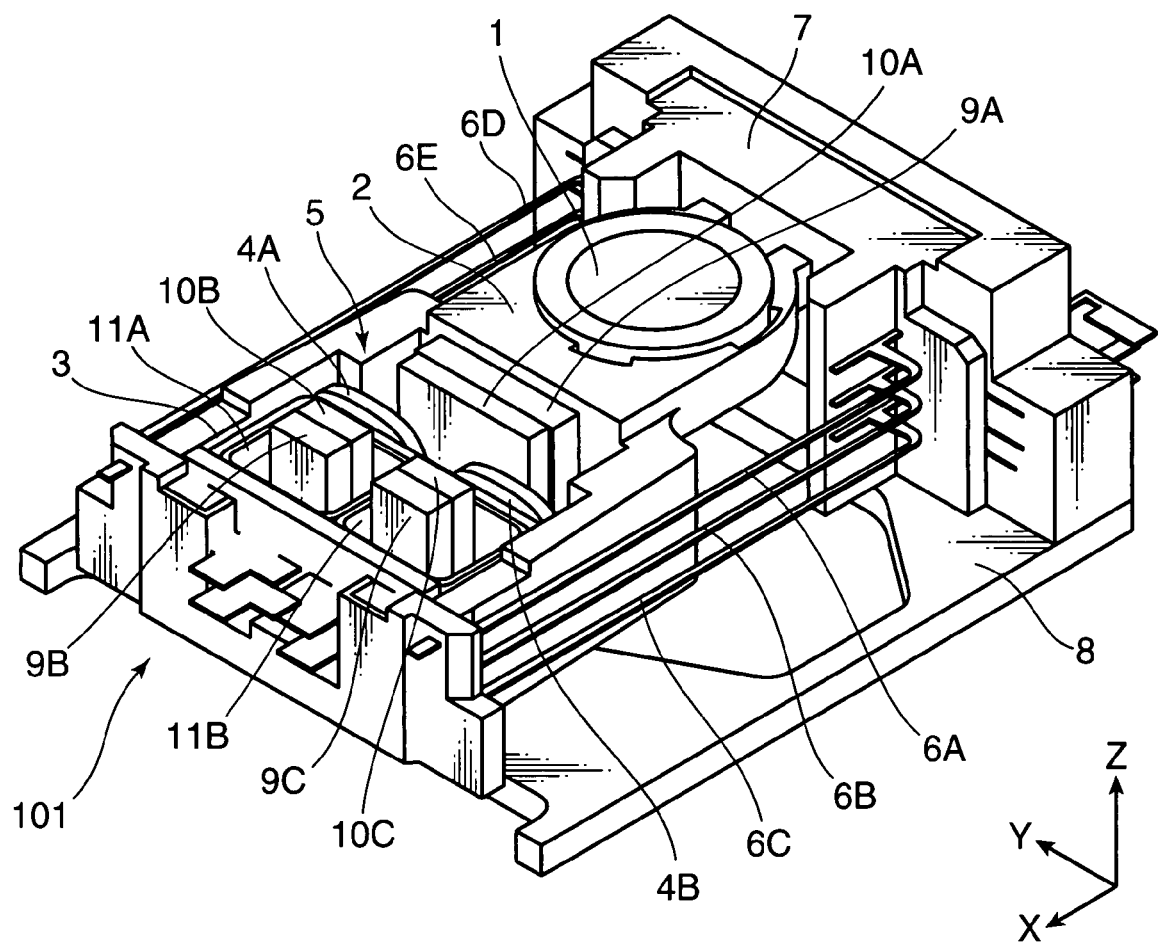
FIG. 1 is a perspective view showing the configuration of an actuator portion in an objective lens driving device according to a first embodiment of the invention.
Figure 2:
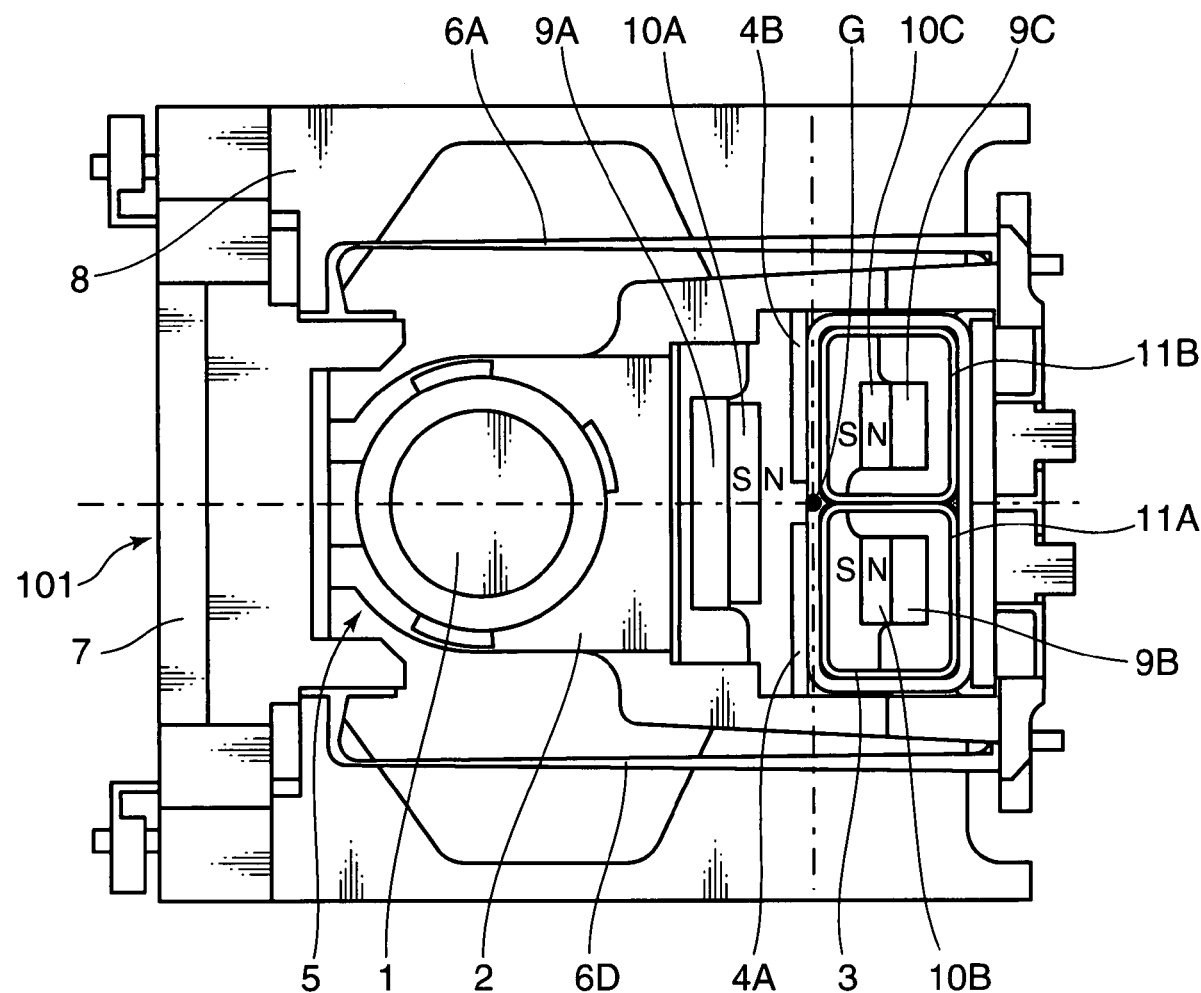
FIG. 2 is a top view of the actuator portion shown in FIG. 1.
Figure 17:
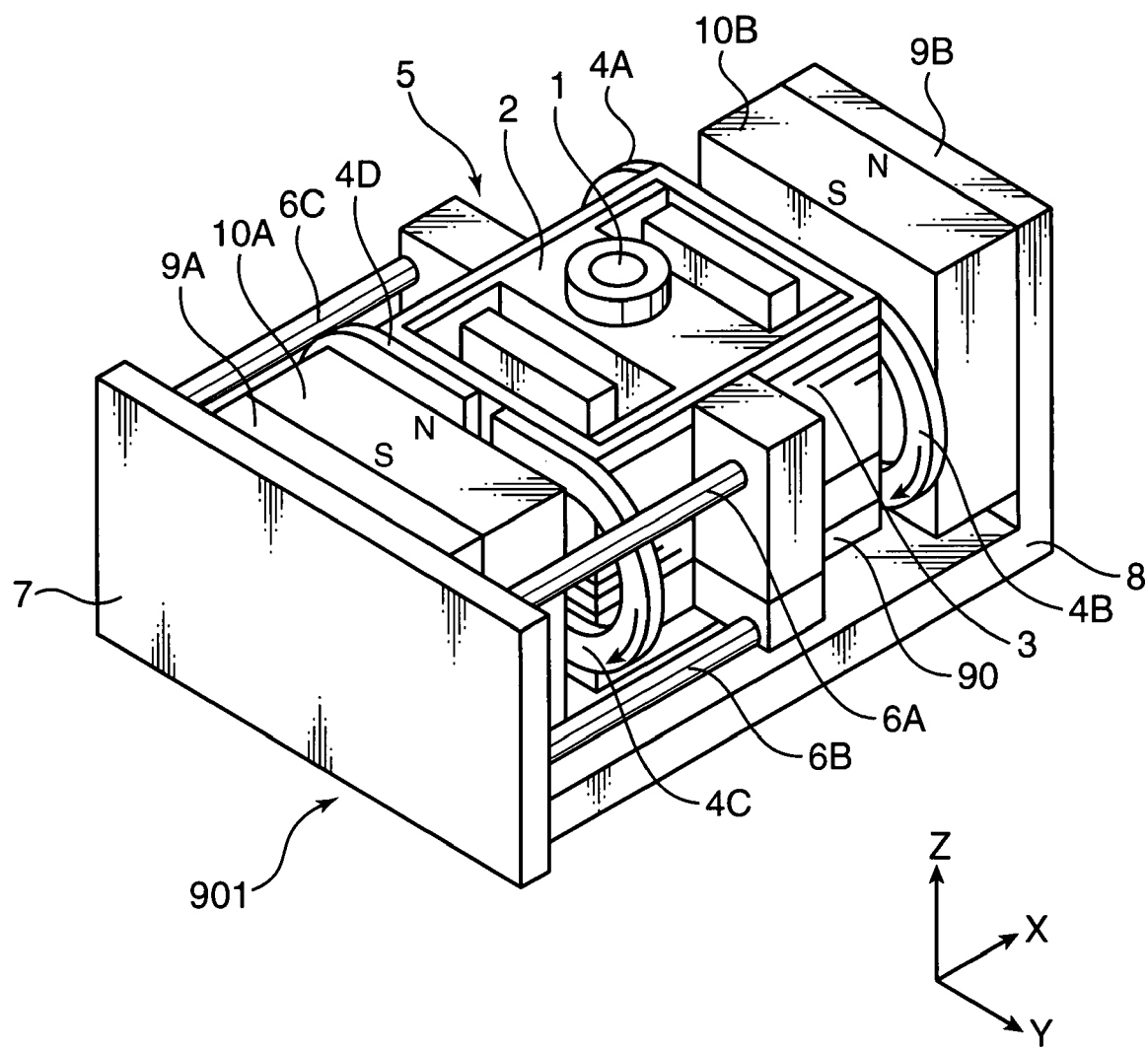
FIG. 17 is an overall perspective view showing an example of an actuator portion in a conventional objective lens driving device.
Figure 18:
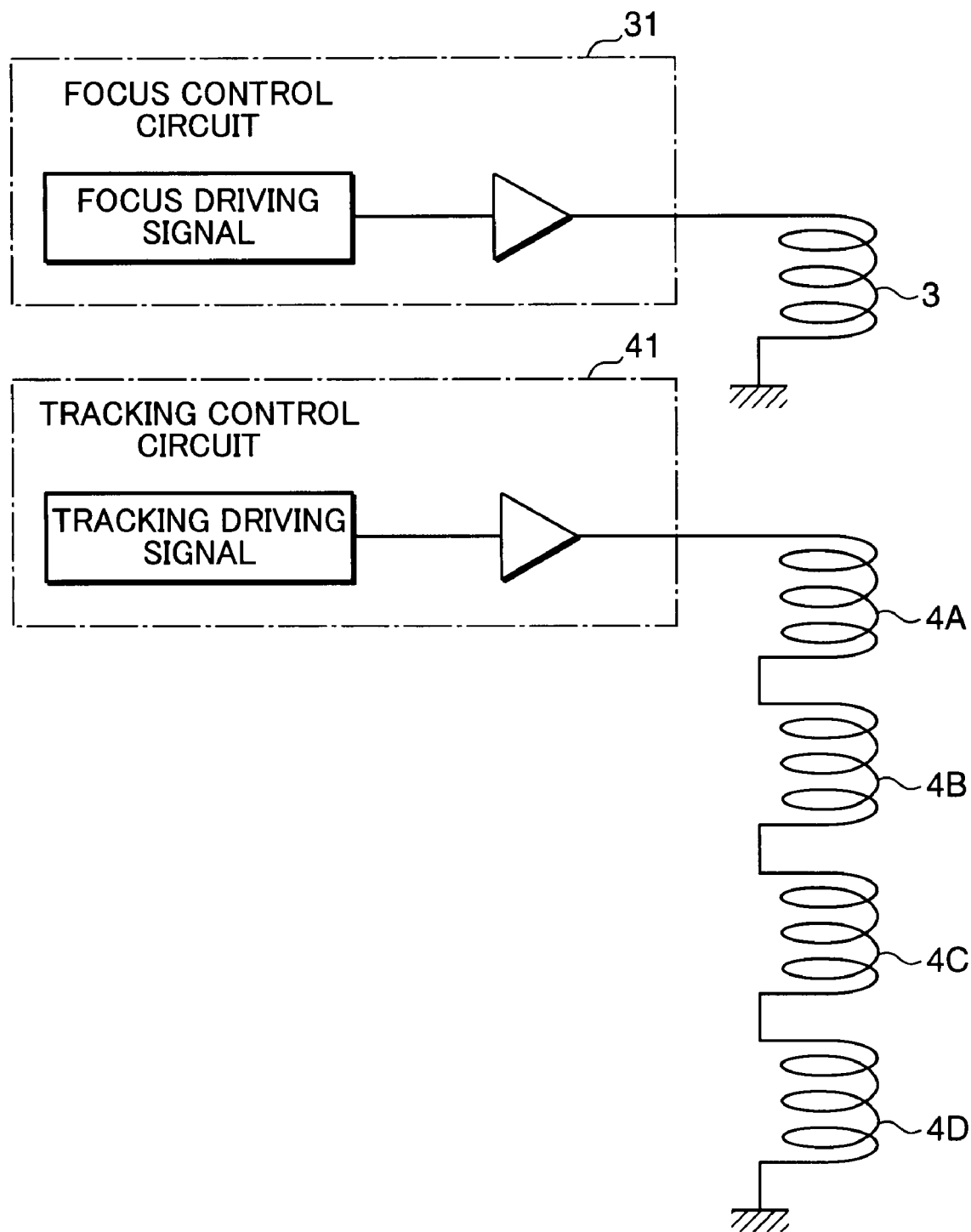
FIG. 18 is a view showing the configuration of a control circuit in the conventional objective lens driving device.
Figure 19:
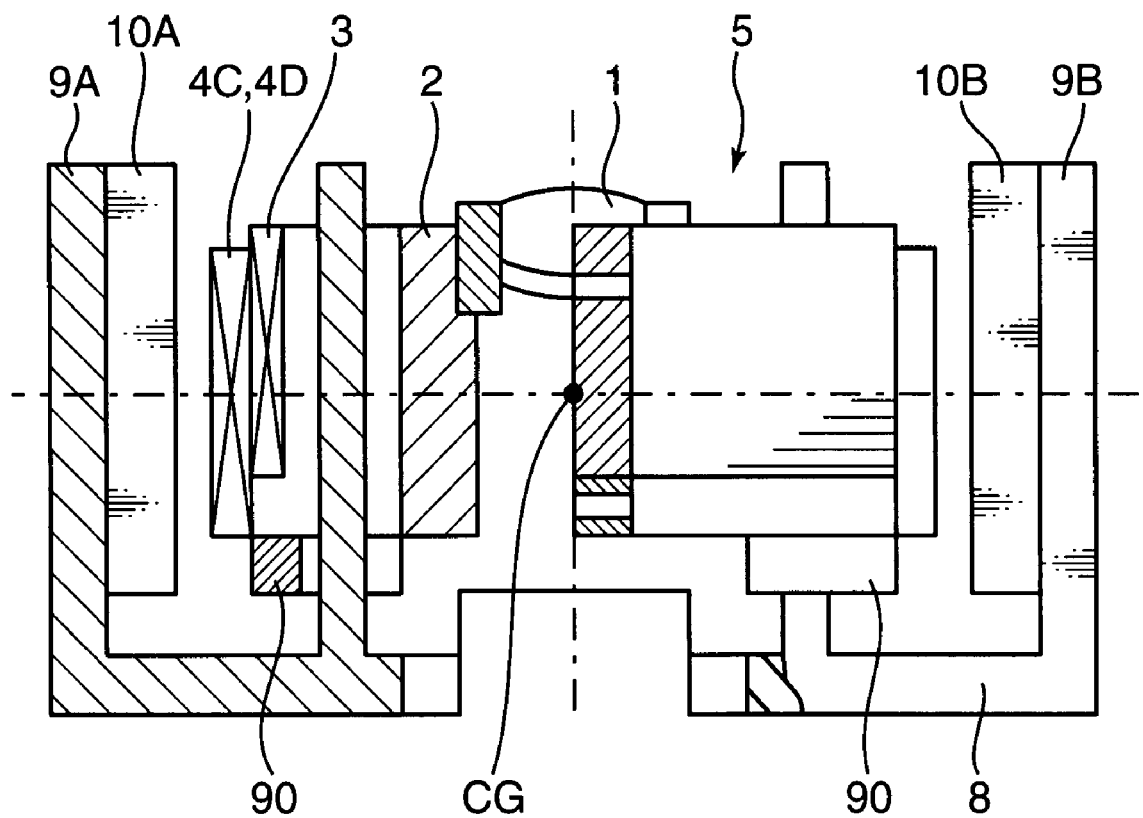
FIG. 19 is a partial sectional side view of the actuator portion shown in FIG. 17.

Initially, an objective lens driving device according to a first embodiment of the invention will be described. FIG. 1 is a perspective view showing the configuration of an actuator portion in the objective lens driving device according to the first embodiment of the invention. FIG. 2 is a top of the actuator portion shown in FIG. 1. Components having the same functions as those in the conventional example shown in FIG. 17 through FIG. 19 are labeled with the same reference numerals, and detailed descriptions thereof are omitted herein.

In an actuator portion 101 shown in FIG. 1 and FIG. 2, an objective lens 1 is made by means of glass press or resin molding, and is fixed by means of bonding to an objective lens holder 2 having a hole into which the objective lens 1 is inserted. The objective lens holder 2 is made by means of resin molding. A focus coil 3 with turns about the Z-axis, two tracking coils 4A and 4B with turns about the X-axis, and two tilting coils 11A and 11B with turns about the Z-axis and disposed to make a pair in the Y-axis direction are bonded and fixed to the objective lens holder 2. The objective lens 1, the objective lens holder 2, the focus coil 3, the tracking coils 4A and 4B, and the tilting coils 11A and 11B together form a movable portion 5.

Six elastic supporting members 6A through 6F made of a thin plate spring material are fixedly bonded to the side surface of the objective lens holder 2 at one end and fixedly bonded to a fixing member 7 at the other end. The elastic supporting members 6A through 6F support the movable portion 5 so as to be able to oscillate in the focus direction (Z-axis direction) and in the tracking direction (Y-axis direction). Both the objective lens holder 2 and the fixing member 7 are made of resin, and they are formed together with the elastic supporting members 6A through 6F by means of insert molding.

The elastic supporting members 6A through 6F are made by punching a metal plate, which is made of phosphor bronze, beryllium copper, or the like excellent in both the current passing property and the spring characteristic, by means of sheet metal press working. They are coupled to the focus coil 3, the tracking coils 4A and 4B, and the tilting coils 11A and 11B by means of soldering at one end so as to pass a current to these members.

A base member 8 is made of a ferromagnetic metal, such as iron, and includes a yoke 9A, a yoke 9B, and a yoke 9C, the first and the last two opposing each other with the focus coil 3 and the tracking coils 4A and 4B in between. A permanent magnet 10A having the magnetic pole direction in the X-axis direction and different magnetic poles in the opposing surfaces is bonded and fixed to the yoke 9A, while a permanent magnet 10B and a permanent magnet 10C each having the magnetic pole direction in the X-axis direction and different magnetic poles in the surfaces opposing each other are bonded and fixed to the yoke 9B and the yoke 9C, respectively, thereby forming a magnetic circuit.

A beam of light emitted from a semiconductor laser disposed in an unillustrated optical system block passes through the hole made in the fixing member 7 and goes incident on the actuator portion 101 in the X-axis direction. An illustrated mirror tilted by 45 degrees is disposed below the objective lens 1, so that the direction of the beam of light is changed from the X-axis direction to the Z-axis direction for the beam of light to go incident on the objective lens 1. The beam of light is thus focused on the information recording surface of an unillustrated optical disc.

Figure 3:
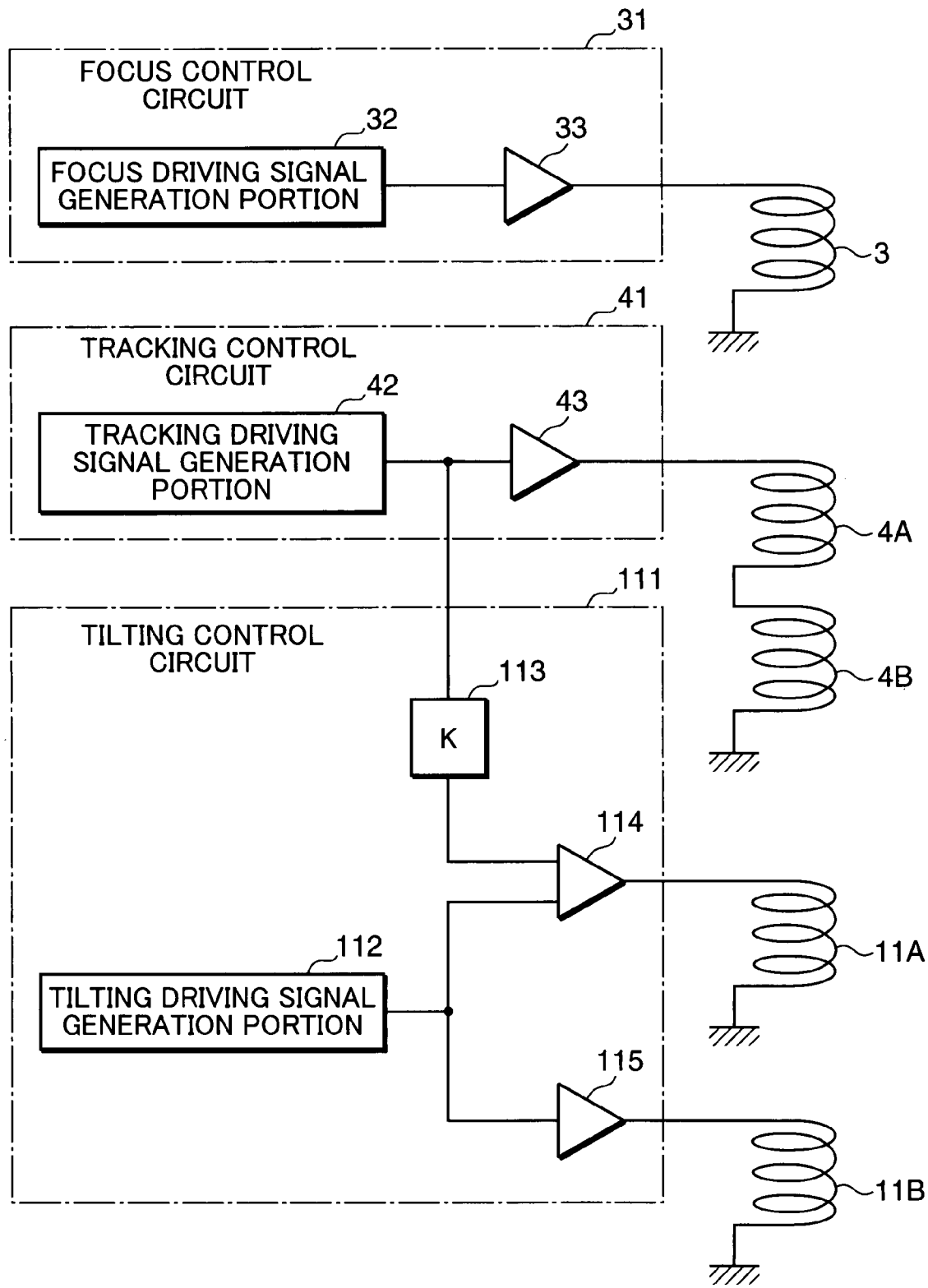
FIG. 3 is a block diagram showing the configuration of a control circuit in the objective lens driving device according to the first embodiment of the invention.

FIG. 3 is a block diagram showing the configuration of a control circuit in the objective lens driving device according to the first embodiment of the invention. The control circuit shown in FIG. 3 includes a focus control circuit 31, a tracking control circuit 41, and a tilting control circuit 111, and drives the actuator portion 101 configured as described above under its control. The control circuit and the actuator portion 101 together form the objective lens driving device.

A focus driving signal generation portion 32 in the focus control circuit 31 generates a focus driving signal on the basis of a focus error signal or the like, and a driving circuit 33 drives the focus coil 3 using the focus driving signal. In the actuator portion 101, when a current corresponding to the focus driving signal is supplied to the focus coil 3 from the focus control circuit 31, an electromagnetic driving force that drives the movable portion 5 in the focus direction is generated by the current flowing, through the focus coil 3 and magnetic fluxes from the permanent magnet 10A and the permanent magnets 10B and 10C forming the magnetic circuit.

The electromagnetic driving force causes the objective lens 1 to move in the focus direction parallel to the optical axis, so that a focus adjustment operation is performed for a beam of light emitted from the semiconductor laser to be irradiated onto an optical disc. When the focus adjustment operation is performed, the movable portion 5, more specifically, the position of the objective lens 1, is adjusted in the Z-axis direction as the elastic supporting members 6A through 6F whose end portions are fixed to the fixing member 7 undergo elastic displacement in the focus direction (Z-axis direction) in FIG. 1.

A tracking driving signal generation portion 42 in the tracking control circuit 41 generates a tracking driving signal on the basis of a tracking error signal or the like, and a driving circuit 43 drives the tracking coils 4A and 4B using the tracking driving signal. In the actuator portion 101, when a current corresponding to the tracking driving signal is supplied to the tracking coils 4A and 4B from the tracking control circuit 41, an electromagnetic driving force that drives the movable portion 5 in the tracking direction (Y-axis direction) is generated by the current flowing through the tracking coils 4A and 4B in portions parallel to the optical axis of the objective lens 1 and magnetic fluxes from the permanent magnet 10A and the permanent magnets 10B and 10C forming the magnetic circuit.

The electromagnetic driving force causes the objective lens 1 to move in the tracking direction orthogonal to the optical axis, so that a tracking adjustment operation is performed for a beam of light emitted from the semiconductor device to be irradiated onto an optical disc. When the tracking adjustment operation is performed, the movable portion 5, more specifically, the position of the objective lens 1, is adjusted in the Y-axis direction as the elastic supporting members 6A through 6F whose end portions are fixed to the fixing member 7 undergo elastic displacement in the tracking direction (Y-axis direction) in FIG. 1.

At the time of the initial adjustment, a tilting driving signal generation portion 112 in the tilting control circuit 111 generates a tilting driving signal to correct the initial tilting occurred during fabrication, and driving circuits 114 and 115 respectively drive the tilting coils 11A and 11B using the tilting driving signal. In the actuator portion 101, when currents corresponding to the tilting driving signal are supplied to the tilting coils 11A and 11B from the tilting control circuit 111, an electromagnetic driving force that drives the movable portion 5 in the focus direction is generated by the currents flowing through the tilting coils 11A and 11B and magnetic fluxes from the permanent magnet 10A and the permanent magnets 10B and 10C forming the magnetic circuit.

At the time of the tracking driving, a multiplier 113 in the tilting control circuit 111 receives the tracking driving signal from the tracking control circuit 41, multiplies the tracking driving signal by K, and outputs the resulting signal to the driving circuit 114. The driving circuit 114 drives the tilting coil 11A by adding the tracking driving signal multiplied by K to the tilting driving signal outputted from the tilting driving signal generation portion 112. In this manner, the objective lens 1 is tilted with respect to the plane (XY plane) orthogonal to the optical axis by providing a difference of electromagnetic driving forces between the tilting coil 11A and the tilting coil 11B. The tilting adjustment operation for the objective lens 1 with respect to the recording/reproduction surface of an unillustrated optical disc is thus performed.

Figure 4:
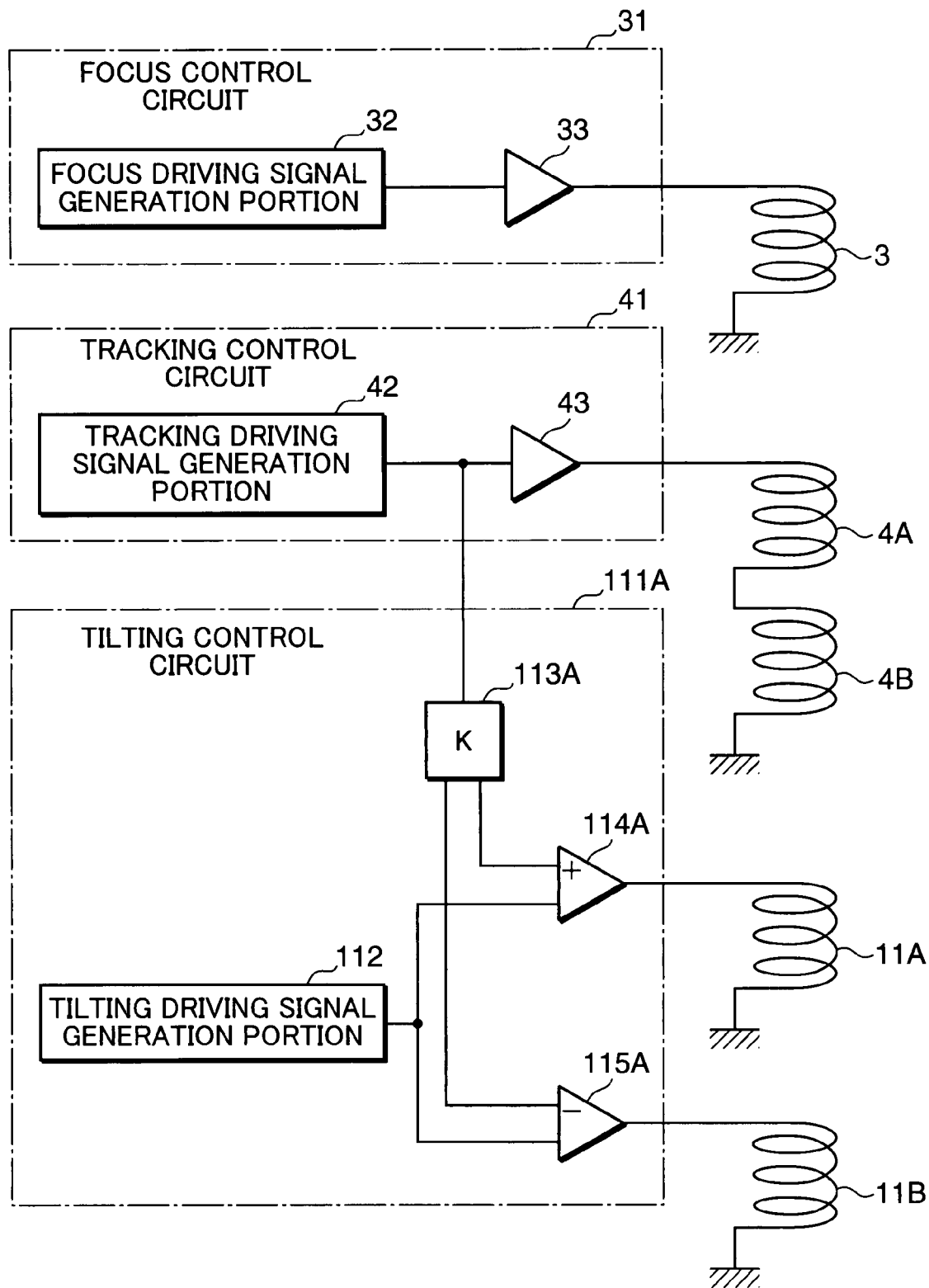
FIG. 4 is a block diagram showing the configuration of another control circuit in the objective lens driving device according to the first embodiment of the invention.

It should be appreciated that the tilting adjustment operation is not particularly limited to the example described above, and various modifications are possible. It may be configured in such a manner that generation directions of the electromagnetic driving forces by the tilting coil 11A and the tilting coil 11B are made opposite to each other. FIG. 4 is a block diagram showing the configuration of another control circuit in the objective lens driving device according to the first embodiment of the invention. Because the focus adjustment operation, the tracking adjustment operation, and the tilting adjustment operation during the initial adjustment by the control circuit shown in FIG. 4 are the same as those by the control circuit shown in FIG. 3, detailed descriptions thereof are omitted herein.

As is shown in FIG. 4, at the time of the tracking driving, a multiplier 113A in a tilting control circuit 111A receives the tracking driving signal from the tracking control circuit 41, multiplies the tracking driving signal by K, and outputs the resulting signal to driving circuits 114A and 115A. The driving circuit 114A drives the tilting coil 11A by adding the tracking driving signal multiplied by K to the tilting driving signal outputted from the tilting driving signal generation portion 112. Meanwhile, the driving circuit 115A drives the tilting coil 11B by subtracting the tracking driving signal multiplied by K from the tilting driving signal outputted from the tilting driving signal generation portion 112. In this manner, it may be configured in such a manner that the objective lens 1 is tilted with respect to the plane (XY plane) orthogonal to the optical axis by making the generation directions of the electromagnetic driving forces by the tilting coil 11A and the tilting coil 11B opposite to each other for performing the tilting adjustment operation of the objective lens 1 with respect to the recording/reproduction surface of an unillustrated optical disc.

Figure 5:
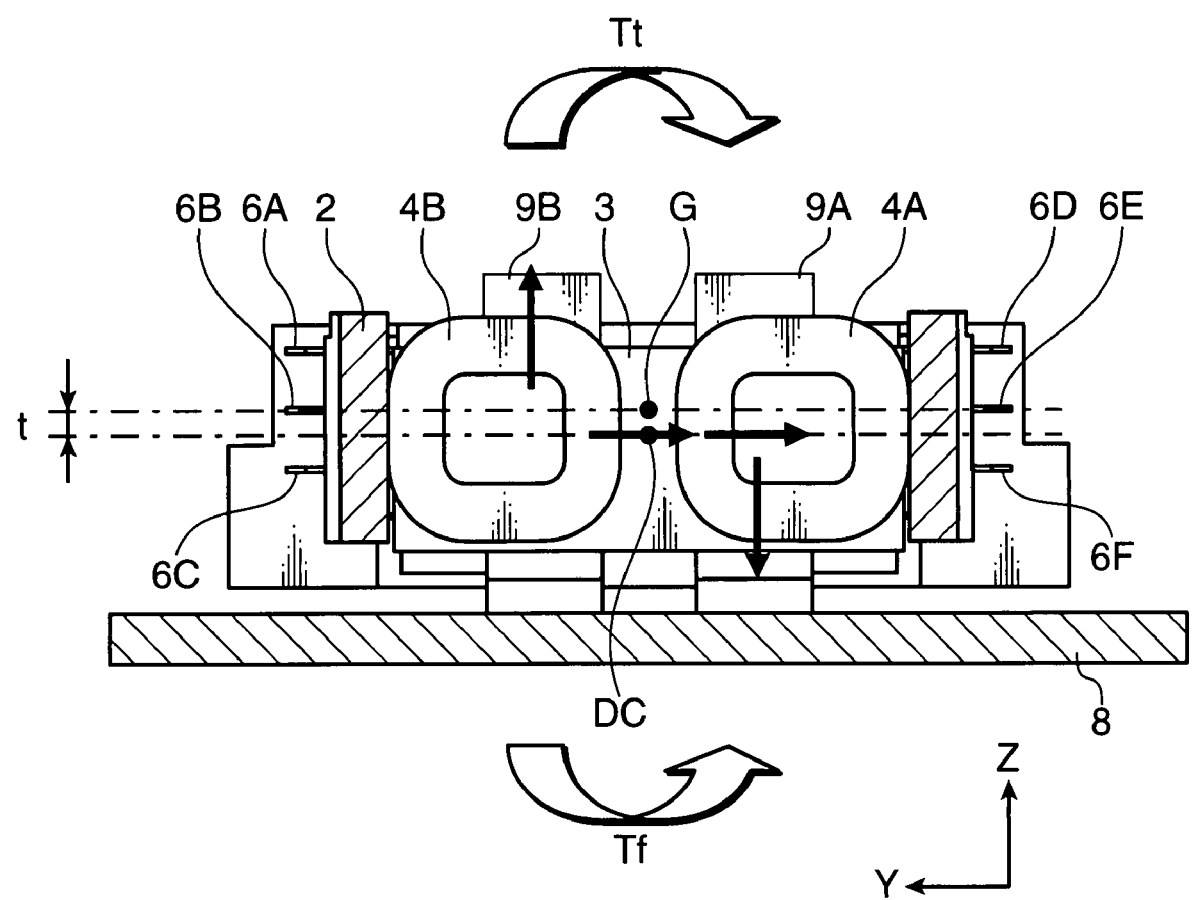
FIG. 5 is a cross section along the YZ plane used to describe a tilting correction operation by the actuator portion shown in FIG. 1.

FIG. 5 is a cross section along the YZ plane used to describe a tilting correction operation by the actuator portion shown in FIG. 1. As is shown in FIG. 5, the movable portion 5 is configured to have a space in which to pass through a laser beam on the lower side (on the minus side of the Z-axis), and the objective lens 1 made of a material having a relatively large specific gravity, such as glass, is disposed on the upper side of the movable portion 5 (on the plus side of the Z-axis). The center of gravity, G, of the movable portion 5 is thus on the upper side thereof (on the plus side of the Z-axis).

Meanwhile, in order to maintain the electromagnetic driving force even when the movable portion 5 moves in the Z-axis direction in association with the surface deviation of the optical disc, it is necessary to dispose the tracking coils 4A and 4B so as not to jump out from the magnetic circuit. The center of the driving force, DC, of the tracking coils 4A and 4B is therefore disposed on the minus side of the Z-axis of the movable portion 5.

In a case where the center of gravity, G, of the movable portion 5 is spaced apart by a distance t from the center of driving force, DC, of the tracking coils 4A and 4B, torque Tf in a counterclockwise direction is induced when an electromagnetic driving force is generated in the −Y direction (indicated by arrows in the horizontal direction in the drawing) by the tracking coils 4A and 4B. The multiplier 113 shown in FIG. 3 thus multiplies the tracking driving signal outputted from the tracking control circuit 41 by a pre-stored initial gain K, for example, 0.1. The driving circuit 114 then drives the tilting coil 11A by adding the tracking driving signal multiplied by K to the tilting driving signal outputted from the tilting driving signal generation portion 112. Consequently, an electromagnetic driving force in the Z direction (indicated by arrows in the vertical direction in the drawing) is generated by the tilting coil 11A, which allows torque Tt in a clockwise direction to be induced in the tilting coil 11A. The torque Tf induced due to the positional displacement between the center of gravity, G, of the movable portion 5 and the center of the driving force, DC, of the tracking coils 4A and 4B is thus cancelled out. As has been described, because the tracking driving signal is branched, the torque Tf can be cancelled out by making the magnitude and the inverse phase of the torque Tt coincide with those of the torque Tf in a broad frequency band. It is thus possible to correct the tilting of the objective lens 1 precisely.

Also, it is preferable to make the center of rotation of the torque Tf coincide with the center of rotation of the torque Tt by making the center of attachment of the tilting coils 11A and 11B in the Z direction (the center of the driving force) coincide with the center of gravity, G, of the movable portion 5. In this case, it is possible to cancel out the torque Tf induced by the tracking coils 4A and 4B by the torque Tt induced by the tilting coil 11A precisely.

A method of setting the gain K will now be described. It should be noted that the method of setting the gain K described below is also applicable to other embodiments.

Figure 6:
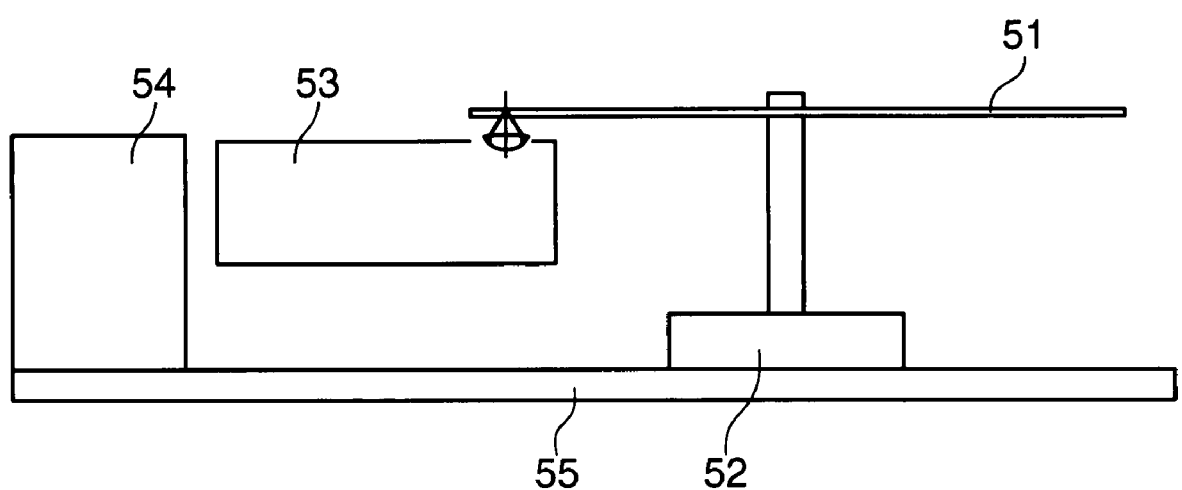
FIG. 6 is a schematic view showing the configuration of an optical disc device equipped with the objective lens driving device formed of the actuator portion shown in FIG. 1 and the control circuit shown in FIG. 3.

FIG. 6 is a schematic view showing the configuration of an optical disc device equipped with the objective lens driving device formed of the actuator portion shown in FIG. 1 and the control circuit shown in FIG. 3. The optical disc device shown in FIG. 6 includes a motor 52 that rotates an optical disc 51, a carriage 53 equipped with the actuator portion shown in FIG. 1, a circuit portion 54 including the control circuit shown in FIG. 3, and a main body portion 55 that supports the carriage 53 so as to be movable in the radial direction of the optical disc 51 and to which the motor 52 and the circuit portion 54 are attached.

At the time of fabrication, for example, an optical disc 51 used as the reference is loaded into the optical disc device configured as described above, and information is reproduced in a state where the gain K of the multiplier 113 is almost zero. In this instance, the objective lens 1 tilts with respect to the optical axis by the tracking adjustment operation and the amplitude of a tracking error signal or the like is reduced. Subsequently, the gain K of the multiplier 113 is adjusted to determine the gain K by storing the value of K when the amplitude of the tracking error signal or the like becomes the maximum into a non-volatile memory inside the multiplier 113.

The setting of the gain described above is performed as the initial setting processing at the time of fabrication. The invention, however, is not particularly limited to this example, and K may be adjusted during the use of the optical disc device as the learning processing in such a manner that the signal amplitude constantly stays at the maximum during the recording/reproduction of a signal in/from the optical disc.

The tilting operation of the movable portion 5 about the X-axis is almost constant in response to an input current in a low frequency band. However, in a high frequency band exceeding a particular frequency (primary resonance frequency), the tilting operation becomes a small vibration operation at a tilt of −40 dB/dec as the frequency becomes higher. At the primary resonant frequency, the tilt becomes extremely large, and the amplitude ratio in the high frequency band is different from the amplitude ratio in the low frequency band due to a difference between the driving force generation position by the tracking coils 4A and 4B and the driving force generation position by the tilting coils 11A and 11B. It is therefore preferable to change the gain K to a gain K1 (for example, K>K1 and preferably, K=0.2 to 0.3 and K1=0.1) in the vicinity of the primary resonant frequency.

In a case where the first peak is present in the low frequency band (for example, 1 to 30 Hz) and the second peak is present in the high frequency band (for example, 80 to 90 Hz) as the tilting frequency characteristic of the movable portion 5 about the X-axis by the optical disc, the gain K may be used in the low frequency band and the gain K1 (for example, K>K1 and preferably, K=0.2 to 0.3 and K1=0.1) may be used in the high frequency band.

As has been described, according to this embodiment, the movable portion 5 includes the tilting coils 11A and 11B, and a signal branched from the tracking driving signal and multiplied by K is added to the tilting driving signal, so that the tilting coil 11A generates the torque Tt in the direction opposite to the torque Tf induced by an amount of positional displacement, t, in the Z direction between the center of the driving force, DC, of the tracking coils 4A and 4B and the center of gravity, G, of the movable portion 5. It is thus possible to suppress the tilting of the objective lens 1 occurring at the time of the tracking driving without using the balancer, which makes it possible to achieve an objective lens driving device that excels in the servo characteristic and consumes less power.

Second Embodiment

Figure 7:
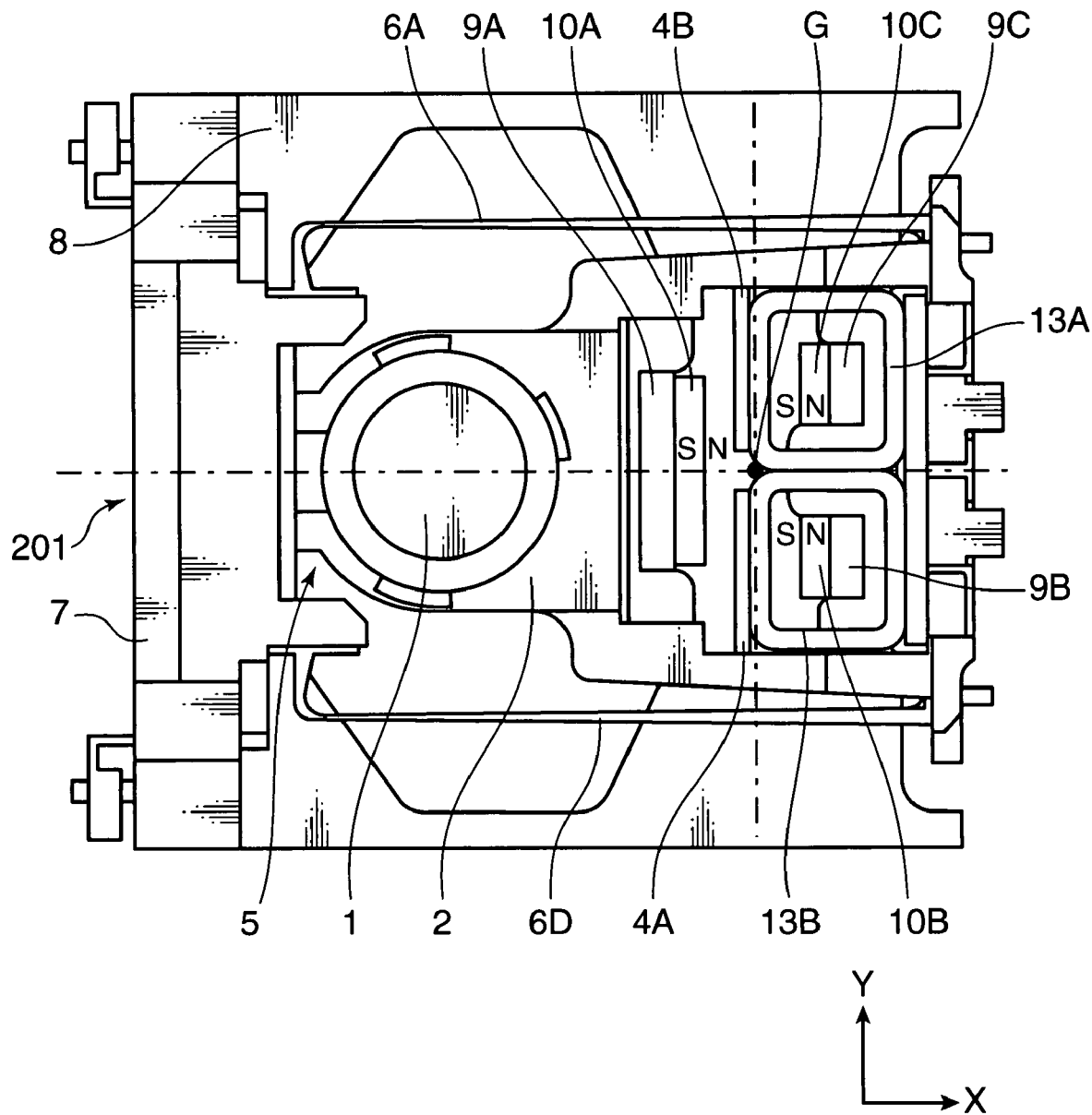
FIG. 7 is a top view showing the configuration of an actuator portion in an objective lens driving device according to a second embodiment of the invention.
Figure 8:
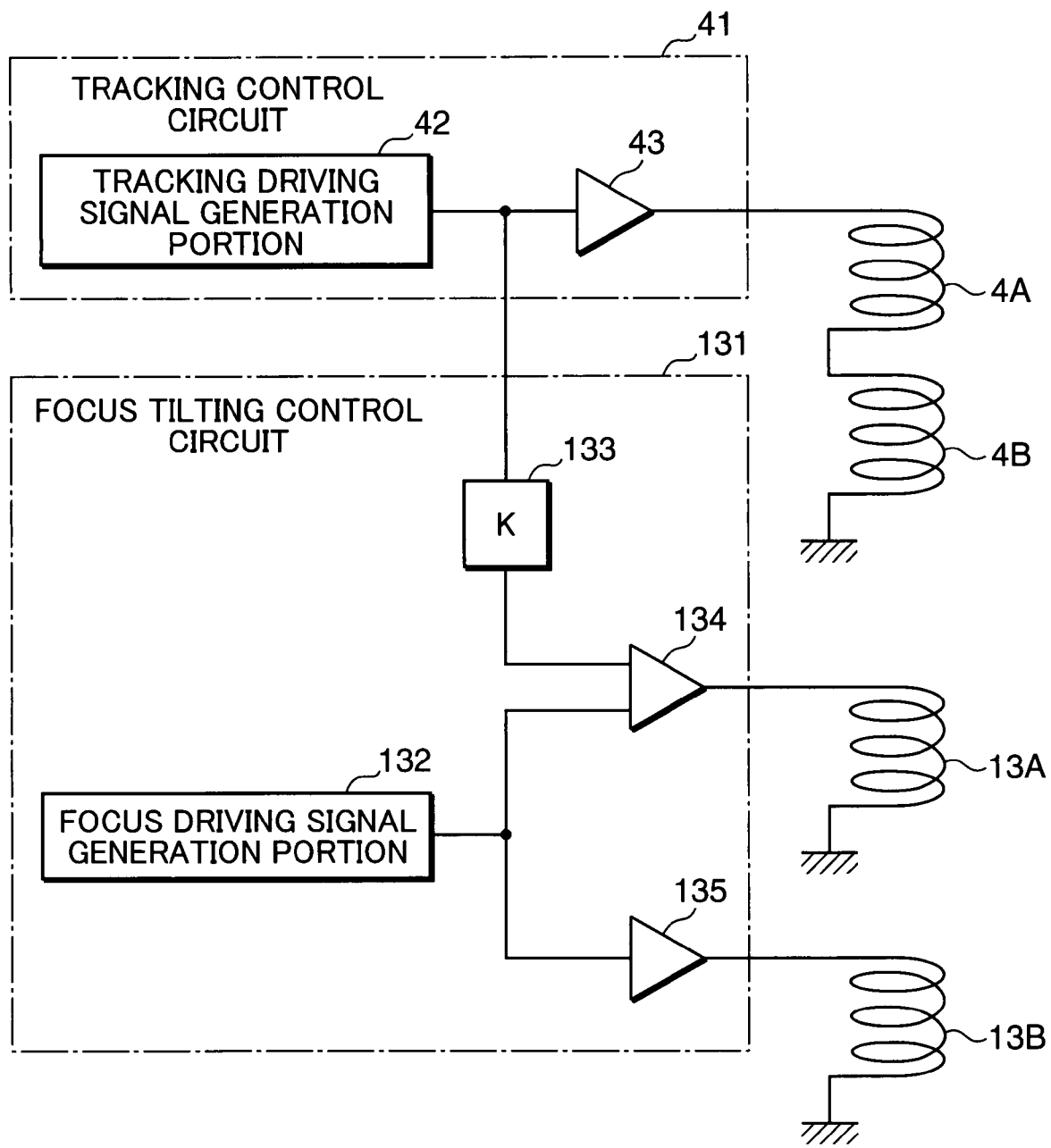
FIG. 8 is a block diagram showing the configuration of a control circuit in the objective lens driving device according to the second embodiment of the invention.

An objective lens driving device according to a second embodiment of the invention will now be described. FIG. 7 is a top view showing the configuration of an actuator portion in the objective lens driving device according to the second embodiment of the invention. FIG. 8 is a block diagram showing the configuration of a control circuit in the objective lens driving device according to the second embodiment of the invention. Components having the functions same as those in the conventional example shown in FIG. 17 through FIG. 19 and the first embodiment shown in FIG. 1 through FIG. 6 are labeled with the same reference numerals, and detailed descriptions thereof are omitted herein.

An actuator portion 201 shown in FIG. 7 includes two focus tilting coils 13A and 13B used commonly in both the focus adjustment operation and the tilting adjustment operation. The focus tilting coils 13A and 13B are coils with turns about the Z-axis and bonded and fixed to the objective lens holder 2 of the movable portion 5.

A focus tilting control circuit 131 shown in FIG. 8 adds a signal branched from the tracking driving signal and multiplied by K to the focus driving signal. At the time of the focus driving, a focus driving signal generation portion 132 generates a focus driving signal on the basis of a focus error signal or the like and outputs the resulting signal to driving circuits 134 and 135. The driving circuit 134 drives the focus tilting coil 13A using the focus driving signal and the driving circuit 135 drives the focus tilting coil 13B using the focus driving signal. In the actuator portion 201, when currents corresponding to the focus driving signal are supplied to the focus tilting coils 13A and 13B from the focus tilting control circuit 131, an electromagnetic driving force that drives the movable portion 5 in the focus direction is generated by the currents flowing through the focus tilting coils 13A and 13B and magnetic fluxes from the permanent magnet 10A and the permanent magnets 10B and 10C forming the magnetic circuit. The movable portion 5, more specifically, the position of the objective lens 1 is thus adjusted in the Z-axis direction in the same manner as in the first embodiment.

Also, at the time of the tracking driving, a multiplier 133 in the focus tilting control circuit 131 receives the tracking driving signal from the tracking control circuit 41, multiplies the tracking driving signal by K, and outputs the resulting signal to the driving circuit 134. The driving circuit 134 drives the focus tilting coil 13A by adding the tracking driving signal multiplied by K to the focus driving signal outputted from the focus driving signal generation portion 132. As has been described, the objective lens 1 is tilted with respect to the plane (XY plane) orthogonal to the optical axis by providing a difference of the electromagnetic driving forces between the focus tilting coil 13A and the focus tilting coil 13B. The tilting adjustment operation for the objective lens 1 with respect to the recording/reproduction surface of an unillustrated optical disc is thus performed.

Figure 9:
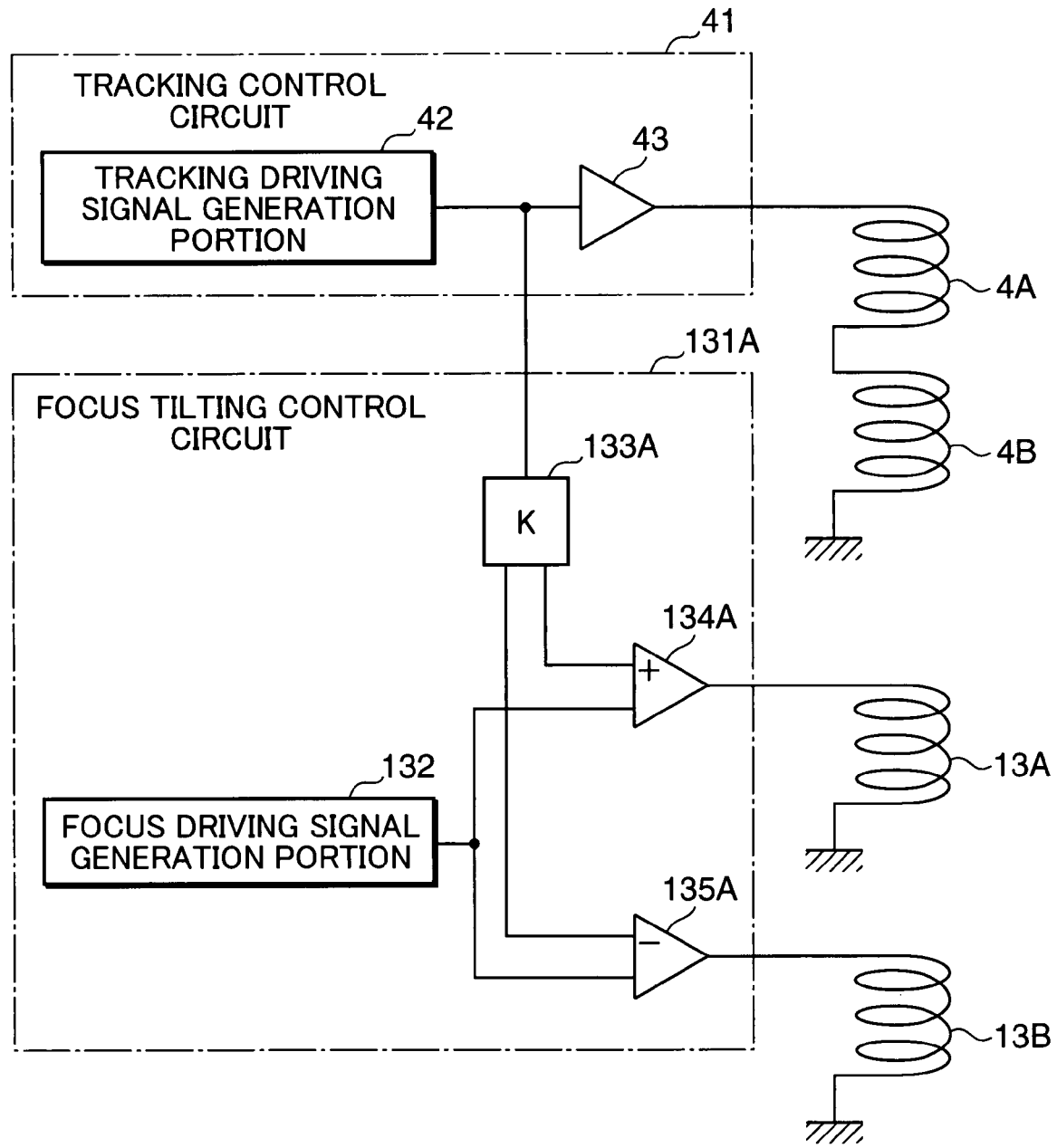
FIG. 9 is a block diagram showing the configuration of another control circuit in the objective lens driving device according to the second embodiment of the invention.

It should be appreciated that the tilting adjustment operation is not particularly limited to the example described above, and various modifications are possible. It may be configured in such a manner that the generation directions of the electromagnetic driving forces by the focus tilting coil 13A and the focus tilting coil 13B are made opposite to each other. FIG. 9 is a block diagram showing the configuration of another control circuit in the objective lens driving device according to the second embodiment of the invention. Because the focus adjustment operation and the tracking adjustment operation by the control circuit shown in FIG. 9 are same as those by the control circuit shown in FIG. 8, detailed descriptions thereof are omitted herein.

As is shown in FIG. 9, at the time of the tracking driving, a multiplier 133A in a focus tilting control circuit 131A receives the tracking driving signal from the tracking control circuit 41, multiplies the tracking control signal by K, and outputs the resulting signal to driving circuits 134A and 135A. The driving circuit 134A drives the focus tilting coil 13A by adding the tracking driving signal multiplied by K to the focus driving signal outputted from the focus driving signal generation portion 132. Meanwhile, the driving circuit 135A drives the focus tilting coil 13B by subtracting the tracking driving signal multiplied by K from the focus driving signal outputted from the focus driving signal generation portion 132. As has been described, it may be configured in such a manner that the objective lens 1 is tilted with respect to the plane (XY plane) orthogonal to the optical axis in the same manner as in the first embodiment by making the generation directions of the electromagnetic driving forces by the focus tilting coil 13A and the focus tilting coil 13B opposite to each other for performing the tilting adjustment operation for the objective lens 1 with respect to the recording/reproduction surface of an unillustrated optical disc.

Figure 10:
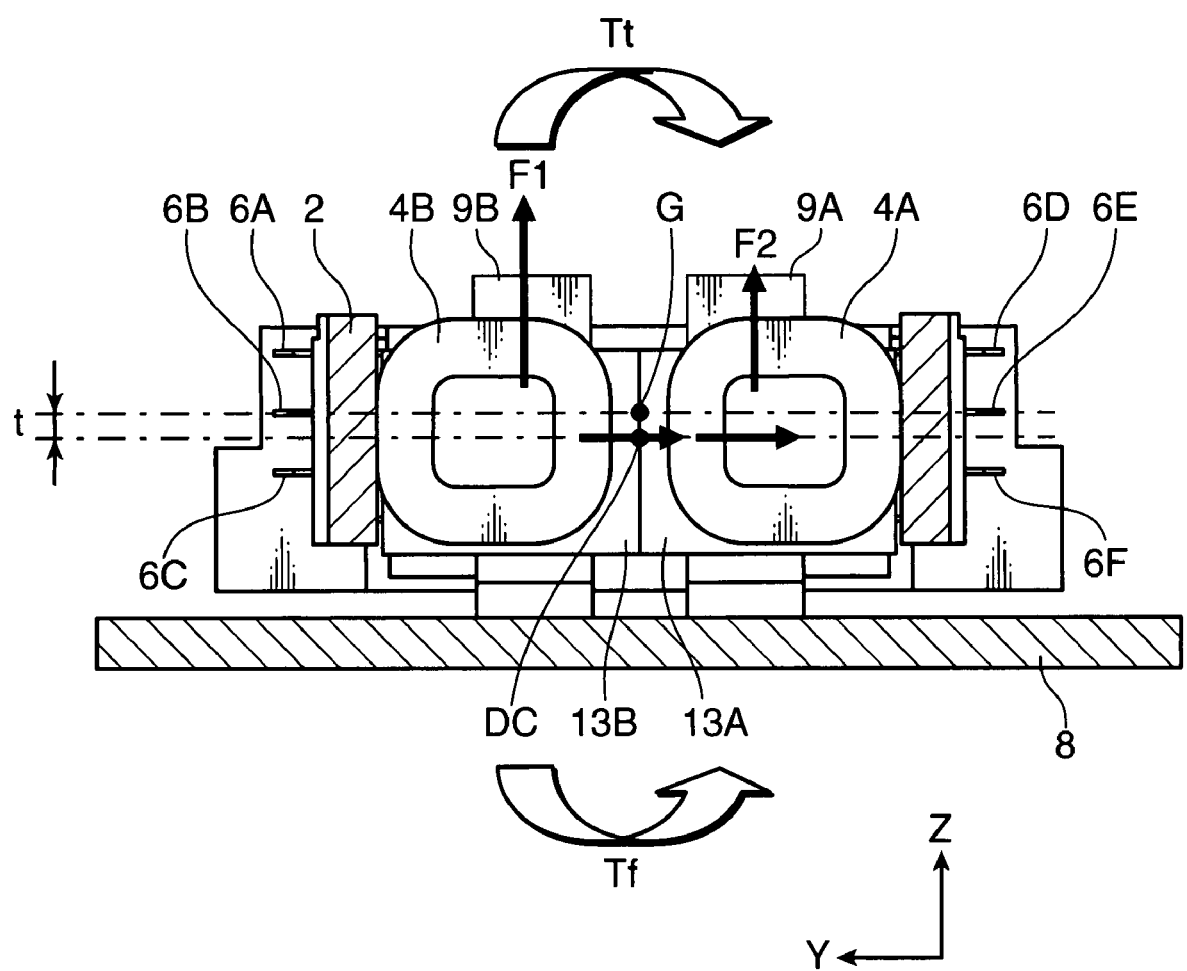
FIG. 10 is a cross section along the YZ plane used to describe a tilting correction operation by the actuator portion shown in FIG. 7.

FIG. 10 is a cross section along the YZ plane used to describe a tilting correction operation by the actuator portion shown in FIG. 7. This embodiment is different from the first embodiment in that the torque Tt cancelling out the torque Tf resulting from the tracking adjustment operation is induced by driving the focus tilting coils 13A and 13B by means of the focus tilting control circuit 131 to perform the focus adjustment operation and the tilting adjustment operation simultaneously. Because the other operations are the same as those in the first embodiment, detailed descriptions thereof are omitted herein.

As is shown in FIG. 10, when the electromagnetic driving force in the −Y direction is generated in the tracking coils 4A and 4B by the tracking adjustment operation, a driving force F1 in the focus direction is generated in the focus tilting coil 13A and a driving force F2 in the focus direction, which is smaller than the driving force F1 in the focus direction, is generated in the focus tilting coil 13B by the focus adjustment operation and the tilting adjustment operation. Consequently, because a total driving force in the focus direction is generated as F1+F2, the torque Tf induced by the tracking adjustment operation is cancelled out by inducing the torque Tt by (F1−F2).

As has been described, according to the configuration of this embodiment, it is possible to achieve the same effect as the first embodiment. Moreover, by including the focus tilting coils 13A and 13B and the focus tilting control circuit 131 and driving the focus tilting coils 13A and 13B by adding a signal branched from the tracking driving signal and multiplied by the gain K to the focus driving signal, the focus tilting coils 13A and 13B and the focus tilting control circuit 131 can be used commonly in both the focus adjustment operation and the tilting adjustment operation. A coil for the exclusive use in the tilting operation can be therefore eliminated, which can in turn reduce the number of components.

Third Embodiment

Figure 11:
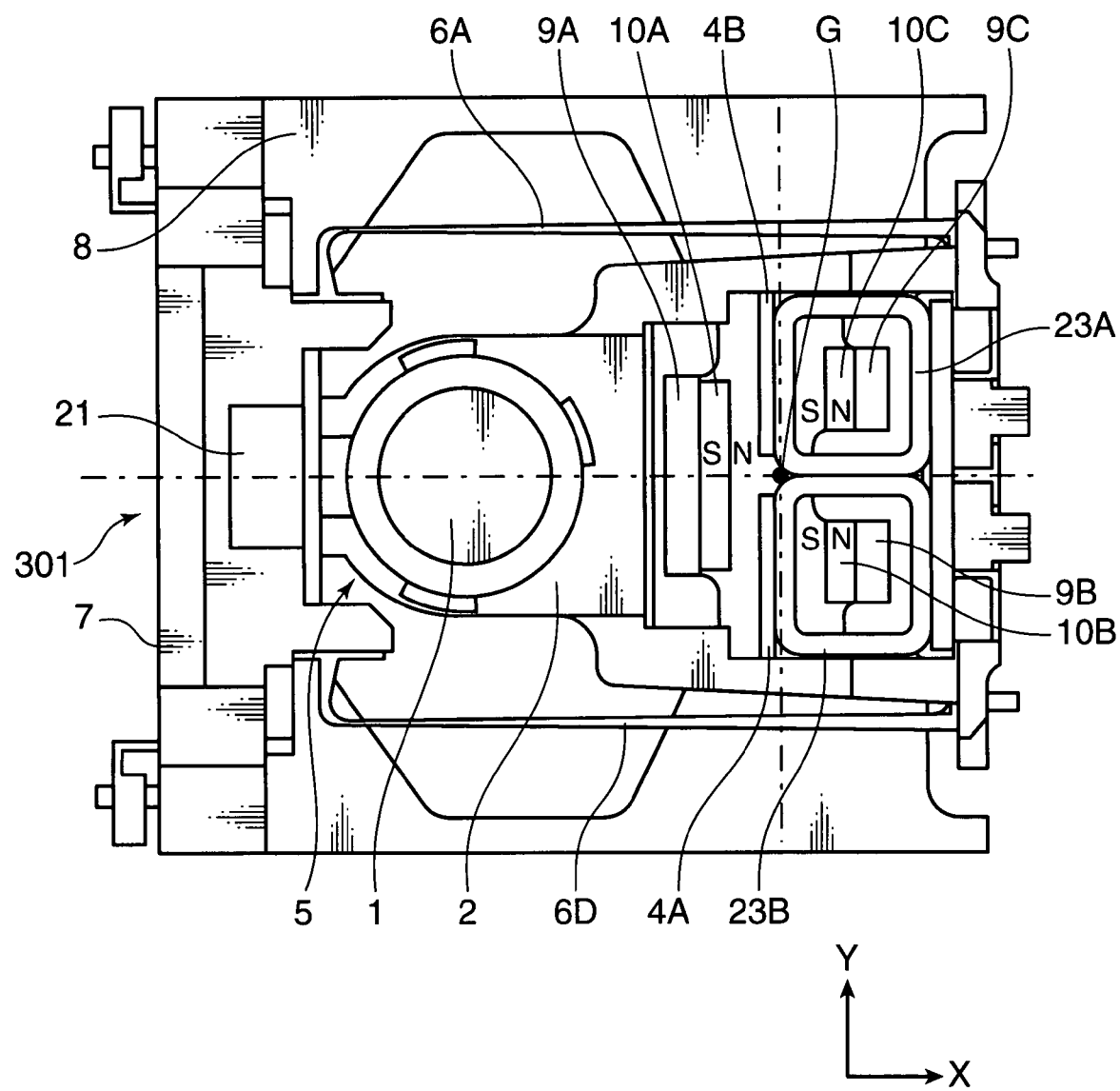
FIG. 11 is a top view showing the configuration of an actuator portion in an objective lens driving device according to a third embodiment of the invention.
Figure 12:
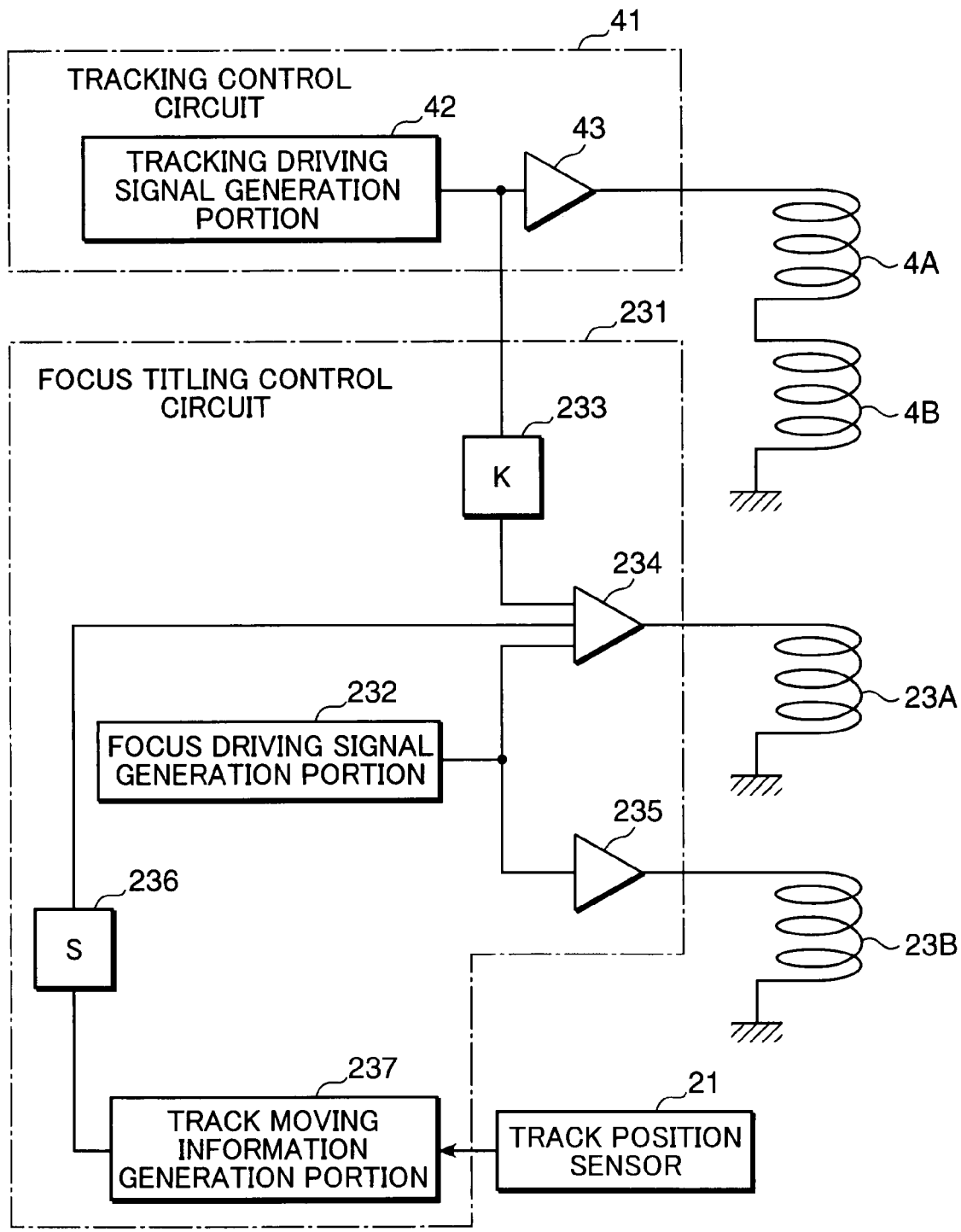
FIG. 12 is a block diagram showing the configuration of a control circuit in the objective lens driving device according to the third embodiment of the invention.

An objective lens driving device according to a third embodiment of the invention will now be described. FIG. 11 is a top view showing the configuration of the actuator portion in the objective lens driving device according to the third embodiment of the invention. FIG. 12 is a block diagram showing the configuration of a control circuit in the objective lens driving device according to the third embodiment of the invention. Components having the functions same as those in the conventional example shown in FIG. 17 through FIG. 19 and the first and second embodiments shown in FIG. 1 through FIG. 10 are labeled with the same reference numerals, and detailed descriptions thereof are omitted herein.

An actuator portion 301 shown in FIG. 11 includes a track position sensor 21 that detects the tracking position of the objective lens 1 and two focus tilting coils 23A and 23B used commonly in both the focus adjustment operation and the tilting adjustment operation. The track position sensor 21 is formed of a photo detector or the like, and detects the position of the movable portion 5 in the tracking direction, more specifically, the tracking position of the objective lens 1, by detecting the position of the reflection plate or the like attached to the objective lens holder 2. As with the focus tilting coils 13A and 13B, the focus tilting coils 23A and 23B are coils with turns about the Z-axis and bonded and fixed to the objective lens holder 2 of the movable portion 5.

A focus tilting control circuit 231 shown in FIG. 12 adds a signal branched from the tracking driving signal and multiplied by K and a track moving information signal generated on the basis of a signal from the track position sensor 21 to specify the position of the movable portion 5 in the tracking direction and multiplied by S to the focus driving signal. At the time of the focus driving, the focus driving signal generation portion 232 generates the focus driving signal on the basis of a focus error signal or the like and outputs the resulting signal to driving circuits 234 and 235. The driving circuit 234 drives the focus tilting coil 23A using the focus driving signal and the driving circuit 235 drives the focus tilting coil 23B using the focus driving signal. In the actuator portion 301, when currents corresponding to the focus driving signal are supplied to the focus tilting coils 23A and 23B from the focus tilting control circuit 231, an electromagnetic driving force that drives the movable portion 5 in the focus direction is generated by the currents flowing through the focus tilting coils 23A and 23B and magnetic fluxes from the permanent magnet 10A and the permanent magnets 10B and 10C forming the magnetic circuit. The movable portion 5, more specifically, the position of the objective lens 1 is thus adjusted in the Z-axis direction in the same manner as in the first embodiment.

Also, at the time of the tracking driving, a multiplier 233 in the focus tilting control circuit 231 receives the tracking driving signal from the tracking control circuit 41, multiplies the tracking driving signal by K, and outputs the resulting signal to a driving circuit 234. A track moving information generation portion 237 generates a track moving information signal from an output of the track position sensor 21. A multiplier 236 then receives the track moving information signal from the track moving information generation portion 237, multiplies the track moving information signal by S, and outputs the resulting signal to the driving circuit 234.

The driving circuit 234 drives the focus tilting coil 23A by adding the tracking driving signal multiplied by K and the track moving information signal multiplied by S to the focus driving signal outputted from the focus driving signal generation portion 232. In this manner, the objective lens 1 is tilted with respect to the plane (XY plane) orthogonal to the optical axis by providing a difference of electromagnetic driving forces between the focus tilting coil 23A and the focus tilting coil 23B. The tilting adjustment operation for the objective lens 1 with respect to the recording/reproduction surface of an unillustrated optical disc is thus performed. It should be noted that the tilting adjustment operation is not particularly limited to the example described above, and various modifications are possible. The generation directions of the electromagnetic driving forces may be made opposite to each other.

This embodiment is different from the first and second embodiments in that an amount of movement of the movable portion 5 in the tracking direction is detected by the track position sensor 21, the track moving information signal is generated by inputting the amount of movement thus detected into the focus tilting control circuit 231, and the focus driving signal is subjected to variable control according to the track moving information signal by adding the signal yielded by multiplying the track moving information signal by the gain S only to one of the focus driving signals, while the torque Td induced by the moving operation of the movable portion 5 in the tracking direction is cancelled out by adjusting the ratio of the driving force F1 generated in the focus tilting coil 23A and the driving force F2 generated in the focus tilting coil 23B by the focus driving signals. The generation principle of the torque Td will be described in the following.

Figure 13:
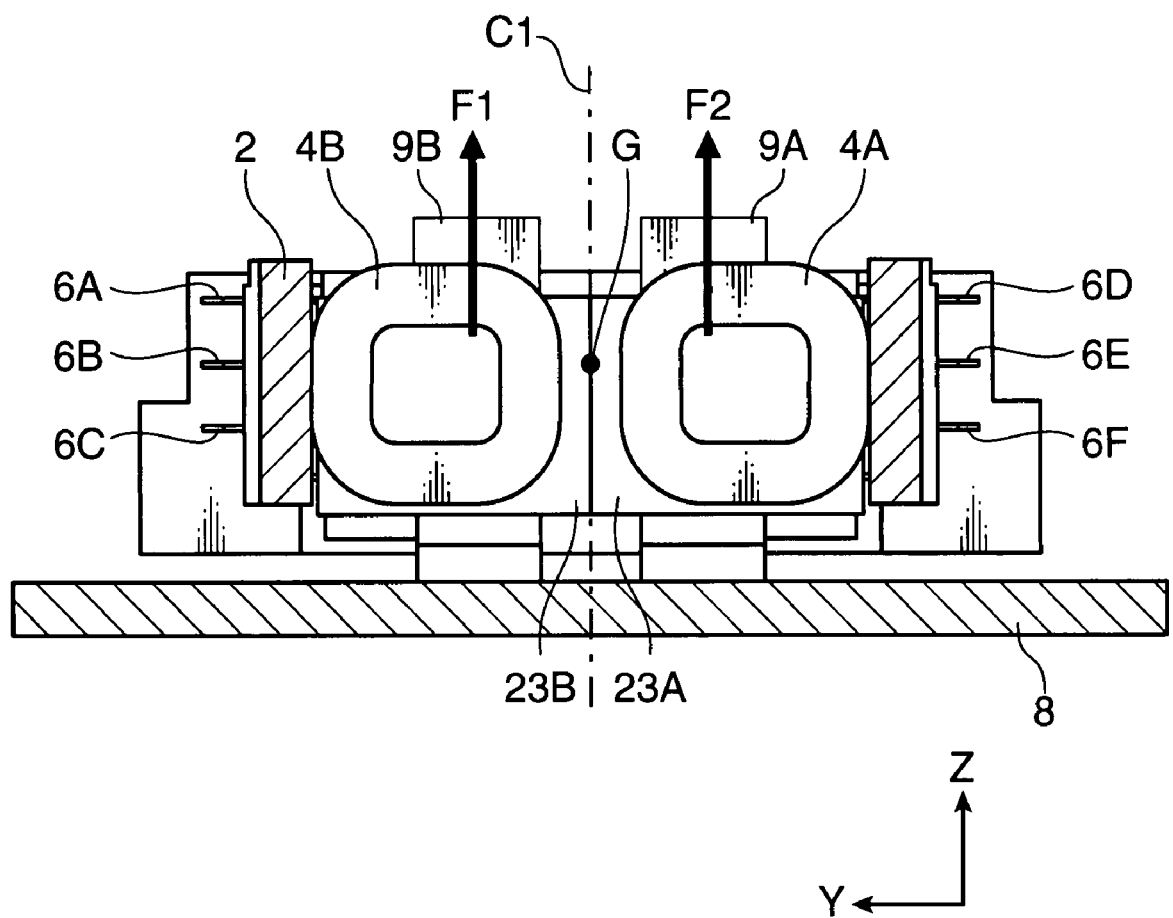
FIG. 13 is a cross section along the YZ plane used to describe a driving force generated in a focus tilting coil when a movable portion in the actuator portion shown in FIG. 11 is at a tracking center position.
Figure 14:
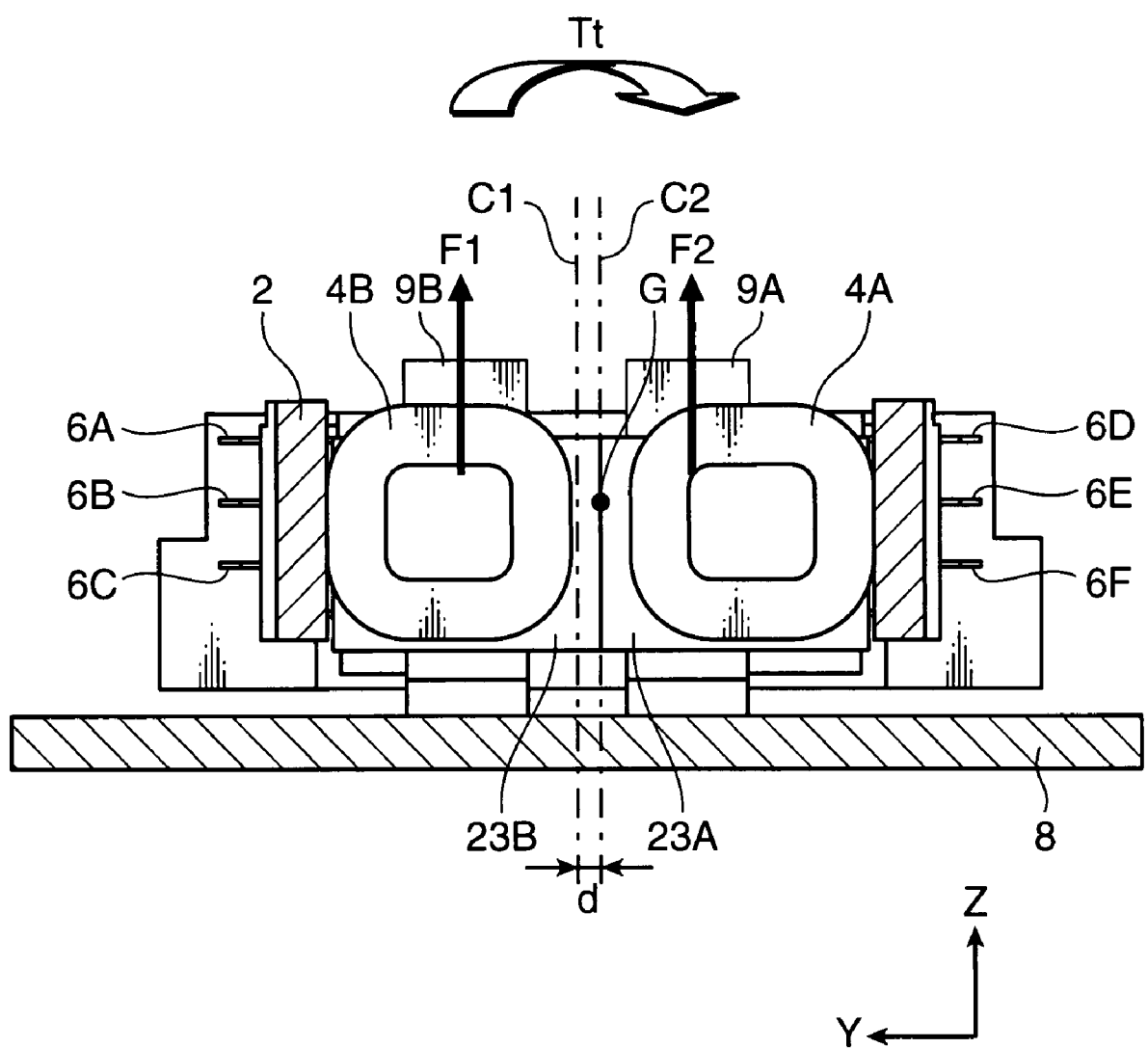
FIG. 14 is a cross section along the YZ plane used to describe torque induced by a driving force generated in the focus tilting coil when the movable portion in the actuator portion shown in FIG. 11 is moved by a distance d in a tracking direction.
Figure 15:
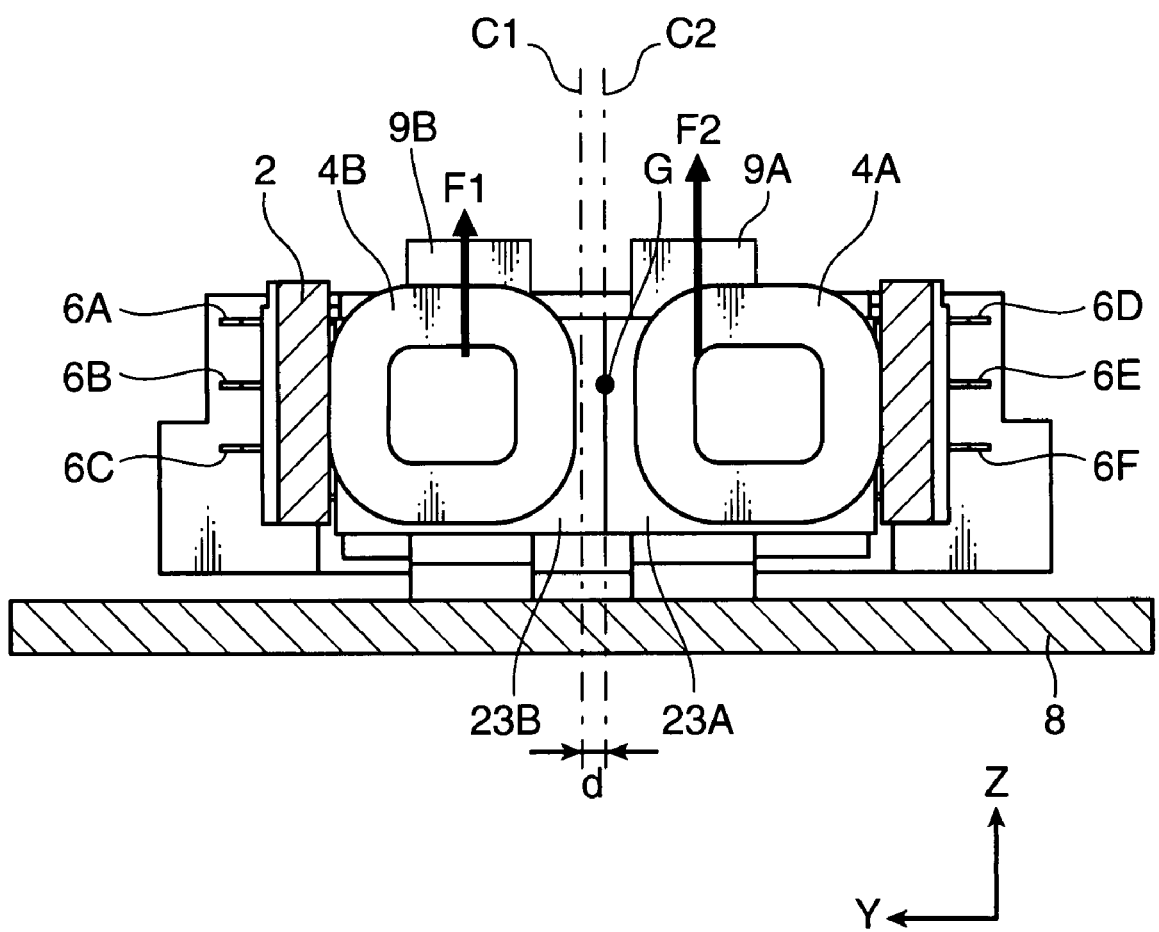
FIG. 15 is a cross section along the YZ plane used to describe a tilting correction operation when the movable portion in the actuator portion shown in FIG. 11 is moved by the distance d in the tracking direction.

FIG. 13 is a cross section along the YZ plane used to describe the driving force generated in the focus tilting coil when the movable portion in the actuator portion shown in FIG. 11 is at a tracking center position. FIG. 14 is a cross section along the YZ plane used to describe the torque induced by the driving force generated in the focus tilting coil when the movable portion in the actuator portion shown in FIG. 11 is moved by a distance d in the tracking direction. FIG. 15 is a cross section along the YZ plane used to describe a correction operation when the movable portion in the actuator portion shown in FIG. 11 is moved by a distance d in the tracking direction.

Firstly, as is shown in FIG. 13, when the movable portion 5 is at the tracking center position (the center position in the tracking direction of the magnetic circuit formed of the yokes 9A through 9C and the permanent magnets 10A through 10C), the driving force F1 generated in the focus tilting coil 23A and the driving force F2 generated in the focus tilting coil 23B are generated symmetrically with respect to the Z-axis C1 passing through the center of gravity, G, of the movable portion 5.

Secondly, as is shown in FIG. 14, when the movable portion 5 is moved by a distance d in the tracking direction (in the −Y direction), the center of gravity, G, moves by the distance d in the −Y direction. However, because the driving force F1 and the driving force F2 are generated symmetrically with respect to the Z-axis C1 passing through the center position of the magnetic circuit formed of the yokes 9A through 9C and the permanent magnets 10A through 10C, they become asymmetric with respect to the Z-axis C2 passing through the center of gravity, G. Hence, the torque Td is induced due to a difference of the distances from the center of gravity, G, to the point of action between the driving force F1 and the driving force F2. The torque Td is proportional to an amount of tracking movement, d, of the movable portion 5.

In order to cancel out the torque Td, in this embodiment, the amount of movement, d, of the movable portion 5 is detected by the track position sensor 21 and the amount thus detected is inputted into the focus tilting control circuit 231, after which as is shown in FIG. 15, torque that cancels out the torque Td is induced by adjusting the magnitudes of the driving force F1 and the driving force F2 in response to the amount of tracking movement, thereby suppressing the generation of the torque Td. Because the other operations are the same as those in the first and second embodiments, detailed descriptions thereof are omitted herein.

As has been described, according to this embodiment, the focus driving signal is branched and an amount of movement of the movable portion 5 in the tracking direction is detected by the track position sensor 21 to generate the track moving information signal by inputting the amount of movement thus detected into the focus tilting control circuit 231, and by adding a signal yielded by multiplying the track moving information signal by the gain S to only one of the focus driving signals, it is possible to subject the focus driving signal to variable control according to the track moving information signal. In this manner, by adjusting the ratio of the driving force F1 generated in the focus tilting coil 23A and the driving force F2 generated in the focus tilting coil 23B, it is possible to cancel out the torque Td induced by the displacement of the center of the focus driving force from the center of gravity, G, of the movable portion 5 caused by the moving operation of the movable portion 5 in the tracking direction. It is thus possible to suppress the tilting of the objective lens 1 caused by the focus driving force generated at the time of the tracking movement.

In this embodiment, an amount of track movement of the movable portion 5 is detected by the track position sensor 21. It should be appreciated, however, that the detection method of an amount of track movement of the movable portion 5 is not particularly limited to the example above, and various modifications are possible. Low frequency components in the tracking driving signal may be extracted with the use of a low-pass filter or the like to be used as a signal specifying the amount of tracking movement.

Figure 16:
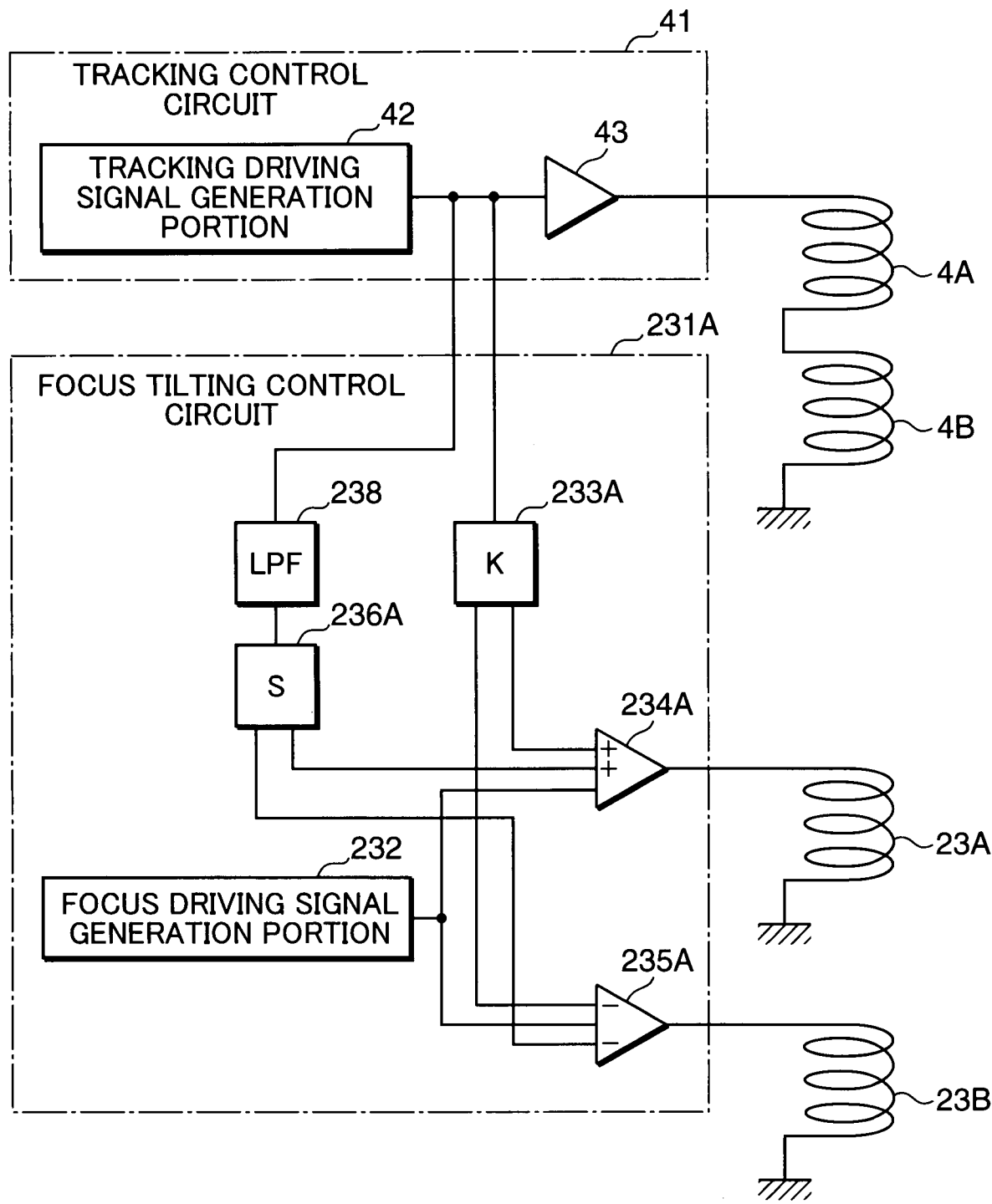
FIG. 16 is a block diagram showing an example of a control circuit that performs a tilting adjustment by detecting an amount of track movement from a tracking driving signal.

FIG. 16 is a block diagram showing an example of a control circuit that performs the tilting adjustment by detecting an amount of track movement from the tracking driving signal. Because the focus adjustment operation and the tracking adjustment operation by the control circuit shown in FIG. 16 are the same as those by the control circuit shown in FIG. 8, detailed descriptions thereof are omitted herein.

A focus tilting control circuit 231A shown in FIG. 16 adds a signal branched from the tracking driving signal and multiplied by K and a signal yielded by multiplying the track moving information signal generated from the tracking driving signal by S to the focus driving signal. At the time of the tracking driving, a multiplier 233 in the focus tilting control circuit 231 receives the tracking driving signal from the tracking control circuit 41, multiplies the tracking driving signal by K, and outputs the resulting signal to driving circuits 234A and 235A. A low-pass filter (LPF) portion 238 receives the tracking driving signal from the tracking control circuit 41 and generates the tracking moving information signal by filtering out only the low frequency components in the tracking driving signal. A multiplier 236A then receives the track moving information signal from the low-pass filter portion 238, multiplies the track moving information signal by S, and outputs the resulting signal to driving circuits 234A and 235A.

The driving circuit 234A drives the focus tilting coil 23A by adding the tracking signal multiplied by K and the track moving information signal multiplied by S to the focus driving signal outputted from the focus driving signal generation portion 232. Meanwhile, the driving circuit 235A drives the focus tilting coil 23B by subtracting the tracking driving signal multiplied by K and the track moving information signal multiplied by S from the focus driving signal outputted from the focus driving signal generation portion 232.

As has been described, by generating the tracking moving information signal from the tracking driving signal and making the generation directions of the electromagnetic driving forces by the focus tilting coil 23A and the focus tilting coil 23B opposite to each other, as with the control circuit shown in FIG. 12, it is possible to perform the tilting adjustment operation for the objective lens 1 with respect to the recording/reproduction surface of an unillustrated optical disc by tilting the objective lens 1 with respect to the plane (XY plane) orthogonal to the optical axis. In this case, because the track position sensor 21 can be eliminated, the number of components can be reduced in addition to the effect described above.

It should be appreciated that the respective embodiments described above can be combined arbitrarily when the need arises. For example, the actuator portion of the first embodiment or this actuator portion provided additionally with the track position sensor 21 may be used as the actuator portion of the third embodiment.

As has been described, an objective lens driving device according to an aspect of the invention includes: an objective lens holder that holds an objective lens; plural elastic supporting members that support the objective lens holder; a tracking driving member that drives the objective lens holder in a tracking direction; a tilting correction member that tilts the objective lens holder with respect to an optical axis passing through the objective lens; a tracking control circuit that drives the tracking driving member; and a tilting control circuit that drives the tilting correction member on the basis of a tracking driving signal generated in the tracking control circuit so as to cancel out a tilting force of the objective lens holder generated by the tracking driving member.

In this objective lens driving device, because the tilting of the objective lens can be corrected by driving the tilting correction member on the basis of the tracking driving signal driving the tracking driving member so as to cancel out the tilting force of the objective lens holder generated by the tracking driving member, it is possible to eliminate the need to make the center position of the tracking driving force coincide with the position of the center of gravity of the movable portion formed of the objective lens holder and the like. Hence, because there is no need to additionally provide the balancer, not only is it possible to reduce power consumption of the objective lens driving device, but it is also possible to make the objective lens driving device thinner while suppressing the occurrence of the tilting of the objective lens holder.

It is preferable that the tilting control circuit drives the tilting correction member using a signal yielded by multiplying the tracking driving signal by a specific scaling factor K so as to cancel out the tilting force of the objective lens holder generated by the tracking driving member.

In this case, because the tilting correction member is driven with the use of a signal yielded by multiplying the tracking driving signal by the specific scaling factor K, that is, a signal corresponding to the tilting force of the objective lens holder generated by the tracking driving member, it is possible to generate the tilting force that can cancel out precisely the tilting force of the objective lens holder generated by the tracking driving member with the use of the tilting correction member. Unwanted tilting of the objective holder can be thus prevented in a reliable manner.

It is preferable that a center of gravity of a movable portion that includes the objective lens, the objective lens holder, the tracking driving member, and the tilting correction member and a center of a driving force of the tilting driving member substantially coincide with each other.

In this case, because the center of gravity of the movable portion including the objective lens, the objective lens holder, the tracking driving member, and the tilting correction member is made to substantially coincide with the center of the driving force of the tilting force generated by the tilting correction member, the both tilting driving forces can be cancelled out with each other in a more reliable manner. It is thus possible to correct the tilting of the objective lens holder precisely.

It is preferable that the tilting correction member includes plural focus and tilting driving members that drive the objective lens holder in a focus direction, and that the tilting control circuit adds a signal yielded by multiplying the tracking driving signal by a specific scaling factor K to a focus driving signal used to drive the plural focus and tilting driving members in the focus direction, and drives at least one of the plural focus and tilting driving members so as to cancel out the tilting force of the objective lens holder generated by the tracking driving member.

In this case, because the focus and tilting driving members can be used commonly as the focus driving member and the tilting driving member, the number of the components of the objective lens driving device can be reduced.

It is preferable that the objective lens driving device further includes a focus driving member that drives the objective lens holder in a focus direction and a tracking position detection portion that detects a position of the objective lens holder in the tracking direction, and that the tilting control circuit drives the tilting correction member so as to cancel out the tilting force of the objective lens holder generated by the focus driving member according to the position detected by the tracking position detection portion.

In this case, because the tilting correction member is driven so as to cancel out the tilting force of the objective lens holder generated by the focus driving member according to the position of the objective lens holder in the tracking direction, it is possible to suppress the tilting of the objective lens holder caused by the focus driving member in response to the movement of the objective lens holder in the tracking direction.

It is preferable that the tracking position detection portion detects the position of the objective lens holder in the tracking direction by filtering out low frequency components in the tracking driving signal.

In this case, because the sensor to detect the position of the objective lens holder in the tracking direction can be eliminated, the number of the components of the objective lens driving device can be reduced.

It is preferable that the tilting control circuit changes the scaling factor K in a low frequency region and in a high frequency region.

In this case, because the scaling factor K is changed in the low frequency region and in the high frequency region, it is possible to generate, with the use of the tilting correction member, a tilting force corresponding to the frequency characteristic for the tilting of the objective lens holder generated by the tracking driving member. It is thus possible to obtain the stable servo property over a broad frequency band.

An objective lens driving device according to another aspect of the invention includes: an objective lens holder that holds an objective lens; plural elastic supporting members that support the objective lens holder; a tracking driving member that drives the objective lens holder in a tracking direction; a focus driving member that drives the objective lens holder in a focus direction; a tilting correction member that tilts the objective lens holder with respect to an optical axis passing through the objective lens; a tracking control circuit that drives the tracking driving member; a focus control circuit that drives the focus driving member; a tracking position detection portion that detects a position of the objective lens holder in the tracking direction; and a tilting control circuit that drives the tilting correction member according to the position detected by the tracking position detection portion so as to cancel out a tilting force of the objective lens holder generated by the focus driving member.

In this objective lens driving device, because the tilting correction member is driven so as to cancel out the tilting force of the objective lens holder generated by the focus driving member according to the position of the objective lens holder in the tracking direction, it is possible to suppress the tilting of the objective lens holder caused by the focus driving member in response to the movement of the objective lens holder in the tracking direction.

An optical disc device according to still another aspect of the invention is configured to include any one of the objective lens driving devices described above, and to record and/or reproduce information in/from an optical disc using the objective lens driving device.

In this optical disc device, because not only is it possible to reduce power consumption of the objective lens driving device, but it is also possible to make the objective lens driving device thinner while suppressing the occurrence of the tilting of the objective lens holder, power consumption of the optical disc device can be reduced while making the optical disk device thinner.

A control circuit according to still another aspect of the invention includes: a tracking control circuit that drives a tracking driving member driving an objective lens holder, which is supported on plural elastic supporting members and holds an objective lens, in a tracking direction; and a tilting control circuit that drives a tilting correction member that tilts the objective lens holder with respect to an optical axis passing through the objective lens on the basis of a tracking driving signal generated in the tracking control circuit so as to cancel out a tilting force of the objective lens holder generated by the tracking driving member.

In this control circuit, because the tilting of the objective lens holder can be corrected by driving the tilting correction member on the basis of the tracking driving signal driving the tracking driving member so as to cancel out the tilting force of the objective lens holder generated by the tracking driving member, there is no need to make the center position of the tracking driving force of the actuator portion used in the objective lens driving device coincide with the position of the center of the gravity of the movable portion formed of the objective lens holder and the like. Hence, because there is no need to additionally provide the balancer, not only is it possible to reduce power consumption of the objective lens driving device, but it is also possible to make the objective lens driving device thinner while suppressing the occurrence of the tilting of the objective lens holder.

A method of driving an objective lens according to still another aspect of the invention includes: a step of driving a tracking driving member that drives an objective lens holder, which is supported on plural elastic supporting members and holds an objective lens, in a tracking direction; and a step of driving a tilting correction member that tilts the objective lens holder with respect to an optical axis passing through the objective lens on the basis of a tracking driving signal from the tracking driving member so as to cancel out a tilting force of the objective lens holder generated by the tracking driving member.

In this objective lens driving method, because the tilting of the objective lens holder can be corrected by driving the tilting correction member on the basis of the tracking driving signal driving the tracking driving member so as to cancel out the tilting force of the objective lens holder generated by the tracking driving member, there is no need to make the center position of the tracking driving force of the actuator portion used in the objective lens driving device coincide with the position of the center of the gravity of the movable portion formed of the objective lens holder and the like. Hence, because there is no need to additionally provide the balancer, not only is it possible to reduce power consumption of the objective lens driving device, but it is also possible to make the objective lens driving device thinner while suppressing the occurrence of the tilting of the objective lens holder.

According to the objective lens driving device of the invention, the need to additionally provide the balancer is eliminated. Hence, not only is it possible to reduce power consumption of the objective lens driving device, but it is also possible to make the objective lens driving device thinner while suppressing the occurrence of the tilting of the objective lens holder. The objective lens driving device is therefore useful as an objective lens driving device or the like used to record and/or reproduce information in/from an optical disc, such as a BD, a DVD, a CD, and an MD.

The invention claimed is:

1. An objective lens driving device, comprising:
   an objective lens;
   an objective lens holder that holds the objective lens;
   a plurality of elastic supporting members that support the objective lens holder;
   a tracking driving member configured to drive the objective lens holder in a tracking direction;
   a tilting correction member configured to tilt the objective lens holder with respect to an optical axis passing through the objective lens;
   a tracking control circuit configured to drive the tracking driving member using a tracking driving signal generated on the basis of a tracking error signal; and
   a tilting control circuit configured to drive the tilting correction member using the tracking driving signal generated in the tracking control circuit so as to cancel out a tilting force of the objective lens holder generated by the tracking driving member;
   wherein:
   the objective lens, the objective lens holder, the tracking driving member, and the tilting correction member are included in a movable portion, and a center of gravity of the movable portion is spaced apart from a center of a driving force of the tracking driving member, the tilting control circuit is configured to drive the tilting correction member using a signal yielded by multiplying the tracking driving signal by a specific scaling factor K and supply the tilting correction member with a current so as to cancel out the tilting force of the objective lens holder induced due to a positional displacement between the center of gravity of the movable portion and the center of the driving force of the tracking driving member, and the tilting control circuit includes a multiplier configured to multiply the tracking driving signal by the scaling factor K which is adjusted so that the tracking error signal has a maximum amplitude.

2. The objective lens driving device according to claim 1, wherein:

the center of gravity of the movable portion and the center of a driving force of the tilting correction member substantially coincide with each other.

3. The objective lens driving device according to claim 1, wherein:

the tilting correction member includes a plurality of focus and tilting driving members configured to drive the objective lens holder in a focus direction; and the tilting control circuit is configured to add the signal yielded by multiplying the tracking driving signal by the specific scaling factor K to a focus driving signal used to drive the plurality of focus and tilting driving members in the focus direction, and being configured to drive at least one of the plurality of focus and tilting driving members so as to cancel out the tilting force of the objective lens holder generated by the tracking driving member.

4. The objective lens driving device according to claim 1, further comprising:

a focus driving member configured to drive the objective lens holder in a focus direction; and a tracking position detection portion configured to detect a position of the objective lens holder in the tracking direction, wherein the tilting control circuit is configured to drive the tilting correction member according to the position detected by the tracking position detection portion so as to cancel out the tilting force of the objective lens holder generated by the focus driving member.

5. The objective lens driving device according to claim 4, wherein:

the tracking position detection portion is configured to detect the position of the objective lens holder in the tracking direction by filtering out low frequency components in the tracking driving signal.

6. The objective lens driving device, according to claim 1, wherein:

the tilting control circuit is configured to change the scaling factor K in a low frequency region and in a high frequency region.

7. An objective lens driving device, comprising:
an objective lens;
an objective lens holder that holds the objective lens;
a plurality of elastic supporting members that support the objective lens holder;
a tracking driving member configured to drive the objective lens holder in a tracking direction;
a focus driving member configured to drive the objective lens holder in a focus direction;
a tilting correction member configured to tilt the objective lens holder with respect to an optical axis passing through the objective lens;

a tracking control circuit configured to drive the tracking driving member using a tracking driving signal generated on the basis of a tracking error signal;

a focus control circuit configured to drive the focus driving member;

a tracking position detection portion configured to detect a position of the objective lens holder in the tracking direction; and a tilting control circuit configured to drive the tilting correction member according to the position detected by the tracking position detection portion so as to cancel out a tilting force of the objective lens holder generated by the focus driving member;

wherein:

the objective lens, the objective lens holder, the tracking driving member, the focus driving member and the tilting correction member are included in a movable portion, and when the movable portion is moved in the tracking direction, a center of gravity of the movable portion is spaced apart from a center of a driving force of the focus driving member, the tilting control circuit is configured to drive the tilting correction member according to the position detected by the tracking position detection portion and supply the tilting correction member with a current so as to cancel out a tilting force of the objective lens holder induced by the displacement of the center of the driving force of the focus driving member from the center of gravity of the movable portion caused by the moving operation of the movable portion in the tracking direction, and the tilting control circuit includes a multiplier configured to multiply the tracking driving signal by a scaling factor K which is adjusted so that the tracking error signal has a maximum amplitude.

8. An optical disc device, comprising:
the objective lens driving device according to claim 1; and
information recorded in and/or reproduced from an optical disc using the objective lens driving device.

9. A control circuit, comprising:

a tracking control circuit configured to drive a tracking driving member driving an objective lens holder, which is supported on a plurality of elastic supporting members and holds an objective lens, in a tracking direction using a tracking driving signal generated on the basis of a tracking error signal; and a tilting control circuit configured to drive a tilting correction member, the tilting correction member being configured to tilt the objective lens holder with respect to an optical axis passing through the objective lens using the tracking driving signal generated in the tracking control circuit so as to cancel out a tilting force of the objective lens holder generated by the tracking driving member;

wherein:

the objective lens, the objective lens holder, the tracking driving member, and the tilting correction member are included in a movable portion, and a center of gravity of the movable portion is spaced apart from a center of a driving force of the tracking driving member, the tilting control circuit is configured to drive the tilting correction member using a signal yielded by multiplying the tracking driving signal by a specific scaling factor K and supply the tilting correction member with a current so as to cancel out the tilting force of the objective lens holder induced due to a positional displacement between the center of gravity of the movable portion and the center of the driving force of the tracking driving member, and the tilting control circuit includes a multiplier configured to multiply the tracking driving signal by the scaling factor K which is adjusted so that the tracking error signal has a maximum amplitude.

10. A method of driving an objective lens, comprising:
driving a tracking driving member so as to drive an objective lens holder, which is supported on a plurality of elastic supporting members and holds an objective lens, in a tracking direction using a tracking driving signal generated on the basis of a tracking error signal; and
driving a tilting correction member so as to tilt the objective lens holder with respect to an optical axis passing through the objective lens using the tracking driving signal from the tracking driving member so as to cancel out a tilting force of the objective lens holder generated by the tracking driving member;
wherein:
the objective lens, the objective lens holder, the tracking driving member, and the tilting correction member are included in a movable portion, and a center of gravity of the movable portion is spaced apart from a center of a driving force of the tracking driving member,
a tilting control circuit drives the tilting correction member using a signal yielded by multiplying the tracking driving signal by a specific scaling factor K and supply the tilting correction member with a current so as to cancel out the tilting force of the objective lens holder induced due to a positional displacement between the center of gravity of the movable portion and the center of the driving force of the tracking driving member, and
the tilting control circuit includes a multiplier that multiples the tracking driving signal by the scaling factor K which is adjusted so that the tracking error signal has a maximum amplitude.

* * * * *